United States Patent
Nielson et al.

(10) Patent No.: US 11,032,252 B2
(45) Date of Patent: Jun. 8, 2021

(54) DISTRIBUTED AUTHENTICATION BETWEEN NETWORK NODES

(71) Applicant: Syccure Inc., Armonk, NY (US)

(72) Inventors: Seth James Nielson, Owings Mills, MD (US); Thomas Capola, Armonk, NY (US)

(73) Assignee: SYCCURE, INC., Armonk, NY (US)

( * ) Notice: Subject to any disclaimer, the term of this patent is extended or adjusted under 35 U.S.C. 154(b) by 346 days.

(21) Appl. No.: 16/238,392

(22) Filed: Jan. 2, 2019

(65) Prior Publication Data
US 2019/0207912 A1     Jul. 4, 2019

Related U.S. Application Data

(60) Provisional application No. 62/613,395, filed on Jan. 3, 2018.

(51) Int. Cl.
*H04L 29/06* (2006.01)
*H04L 9/32* (2006.01)
*G06F 16/27* (2019.01)

(52) U.S. Cl.
CPC .......... *H04L 63/0428* (2013.01); *G06F 16/27* (2019.01); *H04L 9/3242* (2013.01); *H04L 63/0823* (2013.01); *H04L 63/166* (2013.01)

(58) Field of Classification Search
CPC ............ H04L 63/0428; H04L 63/0823; H04L 63/166; H04L 9/3242; H04L 9/0877; H04L 9/0894; H04L 2209/38; H04L 9/3247; H04L 9/3263; H04L 9/3239; G06F 16/27
See application file for complete search history.

(56) References Cited

U.S. PATENT DOCUMENTS

| 2005/0069136 A1* | 3/2005 | Thornton ................ H04L 63/20 380/277 |
| 2005/0262556 A1* | 11/2005 | Waisman ............ H04L 63/0236 726/22 |
| 2006/0015729 A1* | 1/2006 | Novack ................. H04L 9/3263 713/173 |
| 2008/0215849 A1* | 9/2008 | Scott ................... G06F 16/9014 711/216 |

(Continued)

OTHER PUBLICATIONS

Tian et al, CloudKeyBank: Privacy and Owner Authorization Enforced Key Management Framework, Dec. 2015, IEEE, vol. 27 No. 12, pp. 3217-3228 (Year: 2015).*

(Continued)

*Primary Examiner* — Aravind K Moorthy
(74) *Attorney, Agent, or Firm* — Lowenstein Sandler LLP

(57) ABSTRACT

A device stores a first portion of a database, which is distributed across communication devices of a network, and to authenticate a first interaction with a second device: sends a first ID to the second device to authenticate itself with the second device; receives a second ID from the second device; retrieve, using the second ID, a public key associated with one of the first portion of the database or a second portion of the database stored in a third device, which has a third address that is numerically within a threshold value of a first address of the device; and verify, based on a permission stored in relation to the public key, that the second device is authorized to engage in the first interaction with the device.

24 Claims, 15 Drawing Sheets

Distributed Secure Architecture

(56) References Cited

U.S. PATENT DOCUMENTS

| | | | | |
|---|---|---|---|---|
| 2013/0290130 | A1* | 10/2013 | Yuan | G01K 1/022 705/26.7 |
| 2014/0095438 | A1* | 4/2014 | Marwah | G06F 16/217 707/639 |
| 2014/0189082 | A1* | 7/2014 | Fullarton | H04L 67/1065 709/223 |
| 2014/0325115 | A1* | 10/2014 | Ramsundar | G06F 12/0238 711/102 |
| 2015/0012501 | A1* | 1/2015 | Xing | G06F 16/951 707/690 |
| 2015/0302401 | A1* | 10/2015 | Metral | G06Q 20/06 705/71 |
| 2016/0093206 | A1* | 3/2016 | Pfeifle | G06F 16/29 701/117 |
| 2016/0105392 | A1* | 4/2016 | Thakkar | H04L 61/6022 709/220 |
| 2016/0294783 | A1* | 10/2016 | Piqueras Jover | H04L 9/3271 |
| 2016/0323706 | A1* | 11/2016 | Splaine | H04W 4/023 |
| 2016/0358184 | A1* | 12/2016 | Radocchia | G06K 19/07798 |
| 2017/0322992 | A1* | 11/2017 | Joseph | G06F 16/2471 |
| 2018/0032759 | A1* | 2/2018 | Radocchia | G06Q 50/28 |
| 2018/0081759 | A1* | 3/2018 | Motwani | G06F 11/1076 |
| 2018/0089729 | A1* | 3/2018 | Metnick | G06Q 20/34 |
| 2018/0108024 | A1* | 4/2018 | Greco | H04L 9/0637 |
| 2018/0121512 | A1* | 5/2018 | Cho | G06F 16/9024 |
| 2018/0165196 | A1* | 6/2018 | Bernat | G06F 12/0808 |
| 2018/0255456 | A1* | 9/2018 | Yin | H04W 12/041 |
| 2018/0331832 | A1* | 11/2018 | Pulsifer | H04L 9/0637 |
| 2018/0359241 | A1* | 12/2018 | Brockhaus | H04L 63/0823 |
| 2018/0367540 | A1* | 12/2018 | Miranda | H04L 63/0478 |
| 2019/0034427 | A1* | 1/2019 | Trika | G06F 16/21 |
| 2019/0068746 | A1* | 2/2019 | Bhatnagar | H04L 63/062 |
| 2019/0097973 | A1* | 3/2019 | Adler | H04L 63/0236 |
| 2019/0205447 | A1* | 7/2019 | Meron | G06F 16/24544 |
| 2019/0387394 | A1* | 12/2019 | Chennupati | H04W 28/12 |
| 2020/0294039 | A1* | 9/2020 | De Luca | H04L 9/3236 |

OTHER PUBLICATIONS

Dubey et al, Implementing Security Technique on Generic Database, 2015, IEEE, pp. 1-6 (Year: 2015).*

Aparna et al, New Group Key Computation Technique for Secure Group Communication, 2008, IEEE, pp. 1-4 (Year: 2008).*

Yi Tang, Sharing Session Keys in Encrypted Databases, 2006, IEEE, pp. 1-7 (Year: 2006).*

* cited by examiner

Standard mTLS

DISTRIBUTED AUTHENTICATION BETWEEN NETWORK NODES

REFERENCE TO EARLIER FILED APPLICATION

This application claims benefit under 35 U.S.C. § 119(e) of U.S. Provisional Patent Application No. 62/613,395, filed Jan. 3, 2018, which is incorporated herein by this reference in its entirety.

TECHNICAL FIELD

The disclosure relates to network authentication of communication devices, and more particularly, distributed authentication between network nodes of a network.

BACKGROUND

Modern computer networks continue to expand as thousands of objects, including internet-of-things (TOT) devices, are added so as to be able to draw data from these devices and to control these devices in an increasingly automated world. The price of this growth is an ever-increasing security challenge of authenticating and authorizing so many devices, some of which are older or "legacy" devices and others that built on modern technology. Easier security solutions such as white listing leave many security problems, and such conventional approaches to authentication force applications to inflexibly hardwire security into code. More secure solutions, such as that employ public key infrastructure (PKI) to facilitate transport layer security (TLS), are difficult and expensive to implement, are processing intensive, and yet remain vulnerable.

DETAILED DESCRIPTION

Figure 1:
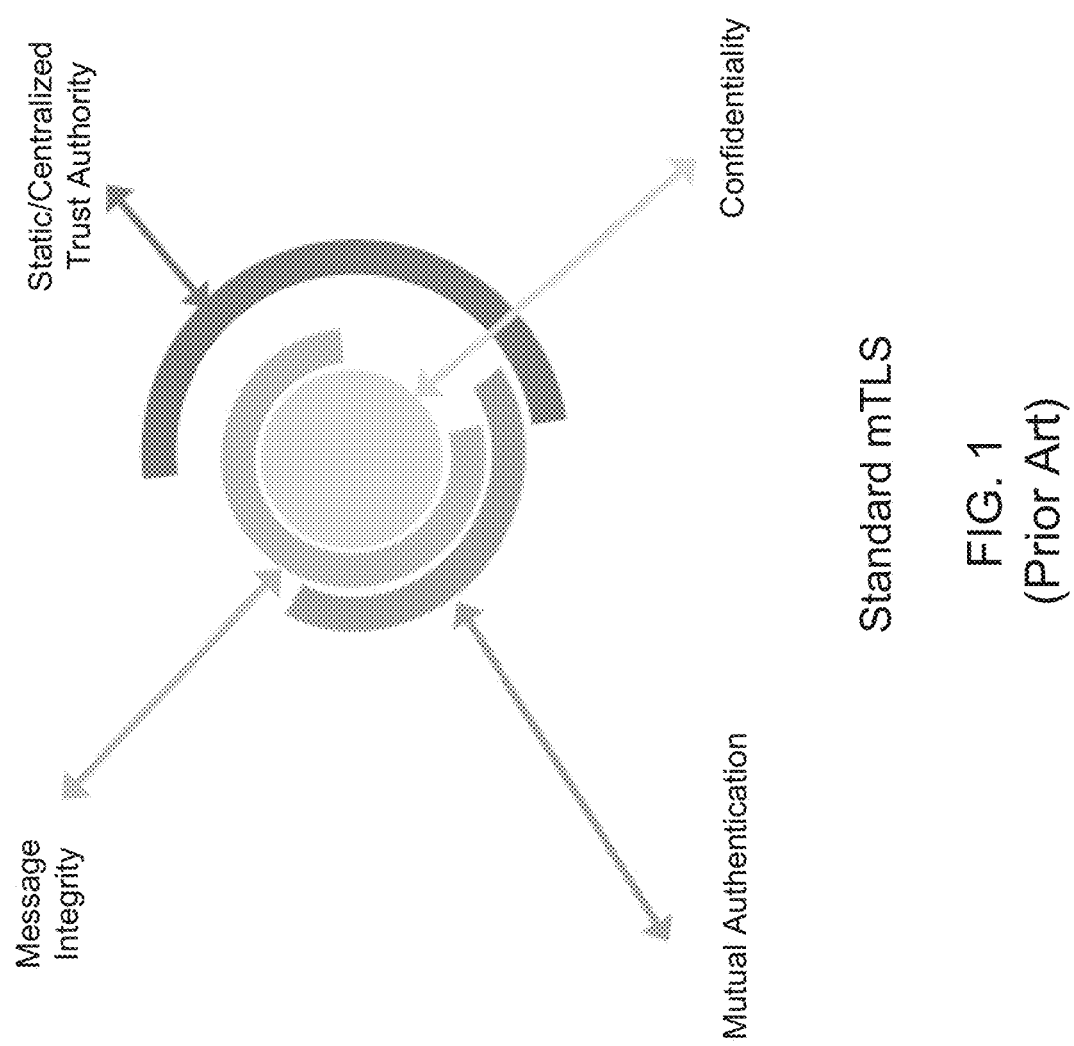
FIG. 1 is a diagram representative of how mutual transport layer security (mTLS) operates according to an embodiment.

FIG. 1 is a diagram representative of how mutual transport layer security (mTLS) operates according to an embodiment. The original name of this security protocol was secure sockets layer (SSL) before it was standardized by the Internet Engineering Task Force (IETF) and given the name of TLS as it is known today. Mutual TLS (mTLS) is a form of TLS, implemented in requiring computers to send certificates to each other to establish mutual trust. Operation of mTLS further provides message integrity and confidentiality, but requires a static, centralized trust authority.

Cryptography is employed to communicate securely over the internet: for example, if data is not encrypted, anyone can examine its packets and read confidential information. Using cryptography, data can also be authenticated in order to determine the true sender and can also be checked to see if the data has been modified en-route. One popular method of encryption is called asymmetrical cryptography, which uses two cryptographic keys pieces of information, usually very large numbers to work properly, one public and one private. The public key may be used to encrypt the data, and the private key may be used to decrypt it. The two keys are related to each other by some complex mathematical formula that is difficult to reverse-engineer by brute force. Asymmetric encryption's popularity stems from the fact that the private key is never revealed, even to a recipient. In many circumstances, this is more secure because the recipient does not have to be trusted. Moreover, asymmetric encryption can also be used for authentication as well as encryption.

Because of the mathematics involved, asymmetrical cryptography takes a lot of computing resources and is typically hundreds of times slower than symmetric encryption. For example, if asymmetrical cryptography was used to encrypt the information in a communications session, a computer and its connection would likely stall or hang for most typical internet interaction. TLS gets around this problem by using asymmetrical cryptography at the very beginning of a communications session to encrypt the conversation. Once initial authentication is established, the server and client then may agree on a single session key that both server and client can use to encrypt their packets from that point forward. Encryption using a shared key is called symmetric cryptography, and is much less computationally intensive than asymmetric cryptography. Because that session key was established using asymmetrical cryptography, the communication session as a whole is much more secure than it otherwise would be, as the session key was not compromised.

The process by which the session key is agreed upon is called a handshake, since it's the moment when the two communicating devices introduce themselves to each other, and is what is at the heart of the TLS protocol. The handshake process, while much more complex, employs the following general steps. First, the client contacts the server and requests a secure connection. The server replies with the list of cipher suites algorithmic toolkits of creating encrypted connections—that it knows how to use. The client compares this against its own list of supported cipher suites, selects one, and lets the server know that they'll both be using it.

Next, the server provides its digital certificate, an electronic document issued by a third-party certificate authority (or "CA") confirming the server's identity. The digital certificate provides authentication and contains the server's public cryptographic key. Once the client receives the certificate, it confirms the certificate's authenticity.

Next, using the server's public key, the client and server establish a session key that both will use for the rest of the session to encrypt communication. There are several techniques for doing this. The client may use the public key to encrypt a random number that's then sent to the server to decrypt data, and both parties then use that number to establish the session key. Alternately, the two parties may use what's called a Diffie-Hellman key exchange to establish the session key. As its name implies, the session key is only good for the course of a single, unbroken communications session. If for some reason communications between client and server are cut off—due to a network problem, for instance, or because the client is idle for too long—a new handshake will be required to establish a new session key when communication is re-established.

With further reference to SSL certificates, these provide the client with the public cryptographic key necessary to initiate secure connections. But the purpose of certificates goes beyond just supplying the key itself; they also authenticate that the key is in fact associated with the organization offering it to the client. Certificates are issued by Certificate Authorities (CAs), who serve as the equivalent of a passport office when it comes to confirming identities. Organizations that want to offer services encrypted by TLS must purchase certificates from CAs, who in turn verify that the organizations are who they claim to be. For example, if one wants to buy a certificate to secure a website at example.com, one would have to take some steps to prove to the CA that you control the example.com domain. That way, if someone connects to example.com and gets a valid SSL certificate issued by a trusted CA, that person can be sure that they're communicating with the legitimate owner of example.com. This can prevent man in the middle attacks.

Notice the reference to "trusted CA." Anyone can set themselves up as a certificate authority, but that does not mean that such an entity is to be "trusted." There also has to be means by which, via due diligence, to authenticate the customers as well. The job of authentication of customers is mostly taken care of by software manufacturers. The decisions on which CAs to trust have high stakes, as was made clear in a 2017 showdown between Google and Symantec over what Google felt were Symantec's lax standards. In March of that year, Google accused Symantec of mis-issuing at least 30,000 certificates, potentially allowing attackers to masquerade as legitimate websites. This showdown led to Google stopping to recognize hundreds of affected certificates and Symantec's sell of their website securities division to DigiCert. This highlights just some of the drawbacks in use of certificates and the TLS protocol.

The exchange and confirmation of information detailed above mostly takes place behind the scenes as a client communicates with a server that offers TLS-encrypted connections. If one wants to get a bit more transparency, a device can enter the Uniform Resource Locator (URL) of an SSL/TLS-encrypted site into an SSL checker website. The checker returns a host of information about the tested site's certificate, including the server type, which web browsers will and won't trust the certificate, the issuer, the serial number, and the expiration date.

TLS 1.2 is the most widely-used version of the SSL/TLS protocol, and has been the recommended version for several years. And although TLS 1.3 is now available as well, it is anticipated that TLS 1.2 will remain in service for some number of years into the future. While TLS 1.2, properly configured, is still considered to be a secure protocol, most TLS servers are configured to allow older TLS versions to be used in order to support older computers. Backwards compatibility has been an ongoing problem for communications protected by TLS and has been the underlying problem behind more than one attack.

In addition to backwards compatibility vulnerabilities, TLS 1.2 has required updated configurations to fix newly discovered vulnerabilities or to phase out antiquated cryptography. Early in its deployment, TLS 1.2 supported DES encryption, which is so weak it was later removed from the protocol. More recently, other configurations for both the asymmetric and symmetric parts of the protocol have been identified as weak and security experts have recommended that they be disabled. Between these backwards compatibility and configuration issues, there are many ways that a system using TLS 1.2 can be vulnerable to so-called "man-in-the-middle" attacks, in which a hacker intercepts packets in mid-communication and sends them on after reading or altering them, including POODLE, SLOTH, and DROWN attacks. No matter how many times TLS is updated, it seems like a new vulnerability is just around the corner.

Another problem with a PKI-based approach such as mTLS is that it employs a set of roles, policies, and procedures, which create, manage, distribute, use, store, and revoke digital certificates and manage public-key encryption. The number of certificates required can be significant and management of certificates is complex, cumbersome, and error prone. In recent months, thousands of certificates have become untrusted because they were fraudulent and/or expired, but many remained in operation, creating significant vulnerabilities for many websites and computers. A PKI approach also requires significant processing resources to implement, and therefore is inadequate for lightweight IoT devices. Furthermore, expirations, complex chain of custody, updates, and revocations are additional security risks inherent with certificate use. Other systemic issues arise with conventional authentication approaches such as software compatibility, scalability, and attempts to force devices to be secured with a one-size-fits all solution that is inadequate.

Figure 2:
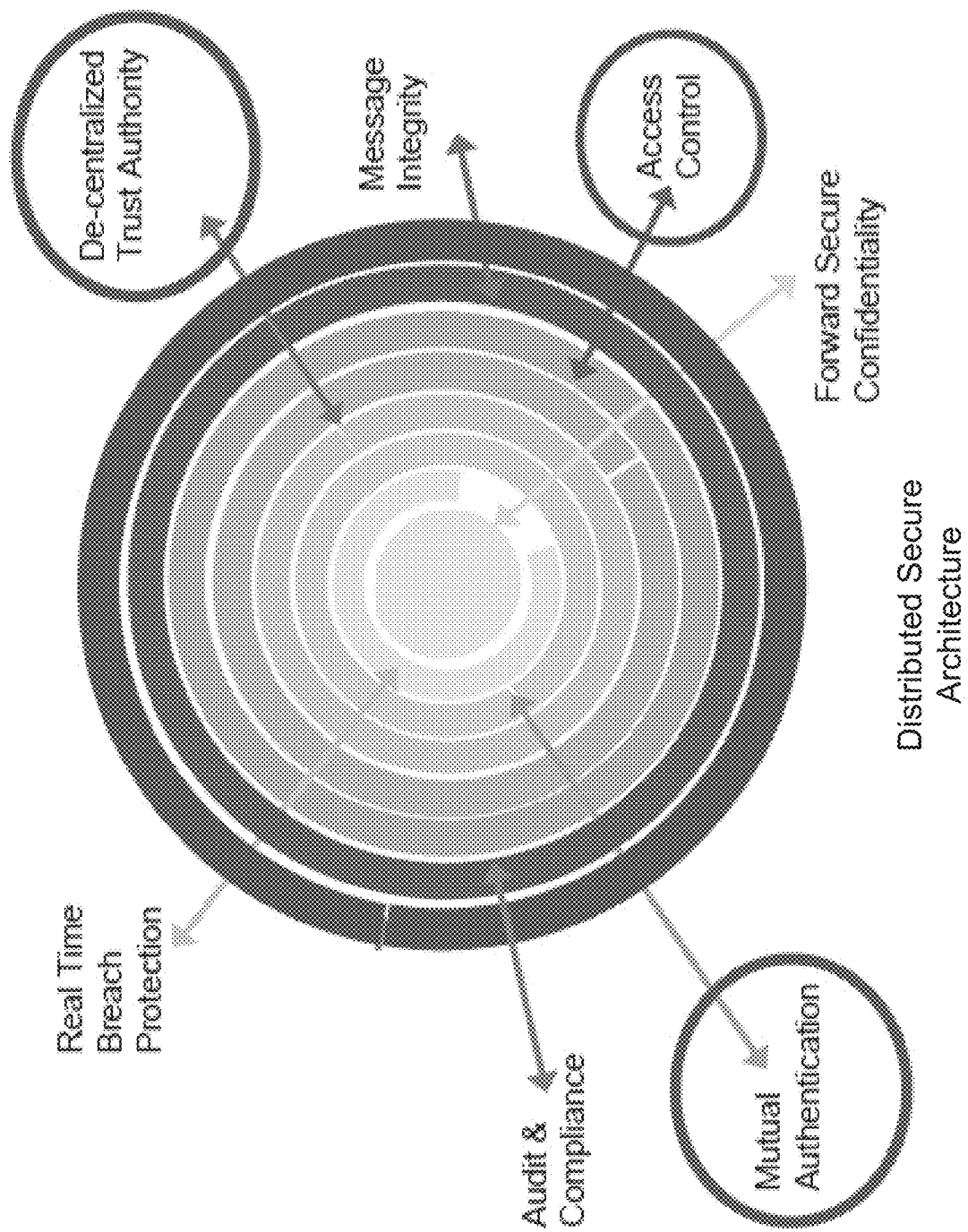
FIG. 2 is a diagram representative of how the present disclosure has expanded and improved on mTLS-based authentication according to various embodiments.

FIG. 2 is a diagram representative of how the present disclosure has expanded and improved on mTLS-based authentication according to various embodiments. While the disclosed embodiments facilitate similar security to mTLS (such as message integrity, confidentiality, and mutual authentication), the disclosed embodiments do so via a de-centralized trust authority that weaves in access control that is permissions-based. The disclosed embodiments also provide real-time breach protection and audit and compliance capability. These and other features are facilitated through use of a database that is distributed throughout multiple communication devices of a communications network.

The disclosed embodiments come with a number of advantages. While these will be discussed in more detail, these advantages include robust communications that are confidential and mutually authenticated. This mutual authentication may extend to devices, applications, software containers, virtual machines, and to bare-metal devices. Trust may be established via a distributed chain of trust. Standard encryption and other protocols may also be used. The disclosed security embodiments are compatible with other architectures, including micro-services such as Envoy, Linkerd, and the like, which will be discussed in more detail. The disclosed embodiments are easy to deploy, configure, and manage at scale, and can co-exist with SSL/TLS. There is also low overhead and low risk in avoiding the use of digital certificates. The disclosed security may be deployed and configured independently of applications that communicate over networked devices.

Figure 3A:
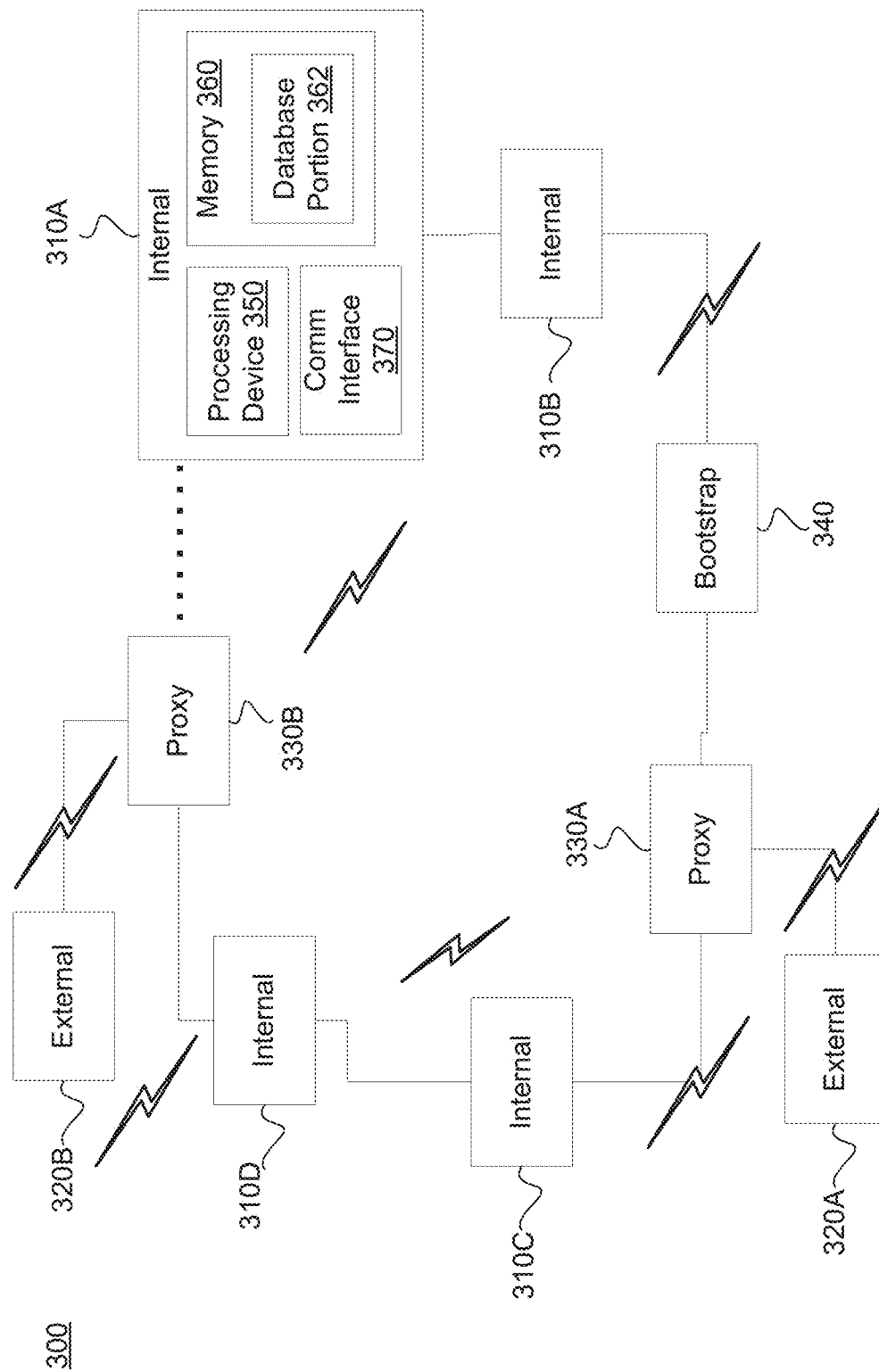
FIGS. 3A and 3B are block diagrams of a network of distributed communication devices that mutually authenticate with use of a distributed database according to various embodiments.
Figure 3B:
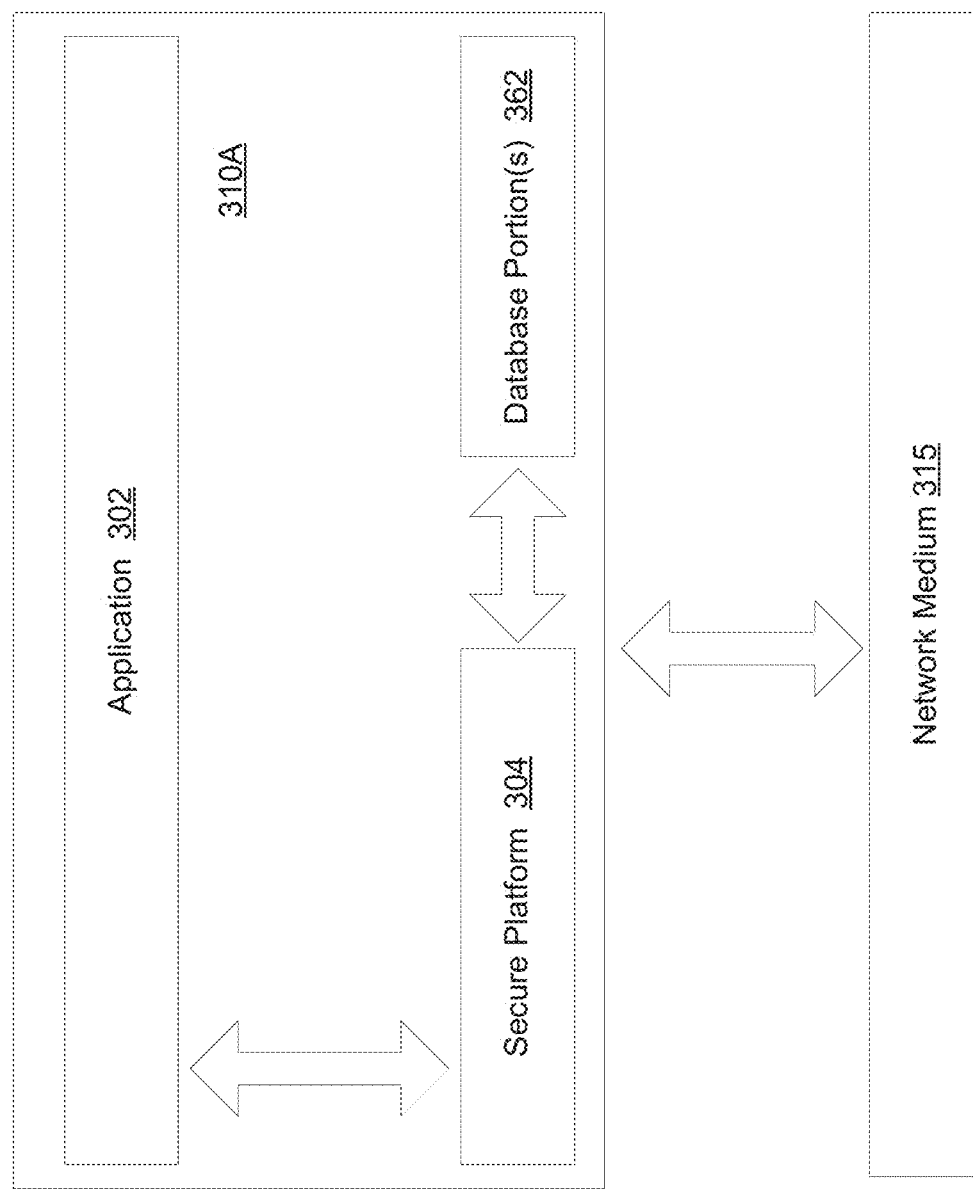

FIGS. 3A and 3B are block diagrams of a network 300 (e.g., a distributed network) of multiple communication devices that mutually authenticate with use of a distributed database according to various embodiments. In one embodiment, the multiple communication devices make up the internal network of an organization or particular entity, such as a local area network (LAN) or a campus area network (CAN). In other embodiments, the network 300 is a wireless local area network (WLAN), a personal area network (PAN), a metropolitan area network (MAN), a wide area network (WAN), or a storage-area network (SAN). In various embodiments, the communication devices may be assigned a different role within the network 300. For example, a first communication device 310A, a second communication device 310B, a third communication device 310C, and a fourth communication device 310D may also be considered internal nodes.

Furthermore, a fourth communication device 330A and a fifth communication device 330B may be assigned as proxy nodes. The fourth communication device 330A may act as proxy in authenticating a first external communication device 320A to other communication devices of the network 300. The fifth communication device 330B may act as proxy in authenticating a second external communications device 320B to other communication devices on the network 300. Each of the external communication devices may therefore not be considered a part of the network 300, but may be authenticated by the proxy nodes to communicate with at least select one or more communication devices of the network 300, up to and including permissions granted to the proxy node through which access to the select communication devices is obtained.

The network 300 may further include a seventh communication device 340 that is assigned as a bootstrap node. A bootstrap node is given the authority, by way of a bootstrap public key of a genesis key, to add communication devices to the network 300 as trusted nodes, and to encode permissions within the communication devices as will be explained in more detail with reference to FIGS. 6A-6B.

As illustrated with reference to the first communication device 310A, at least some of the multiple communication devices may include a processing device 350, a memory 360 in which a database portion 362 of a distributed database is stored, and a communication interface 370. Although the first communication device 310A is illustrated having particular computer hardware, it is possible that more than one node (e.g., internal node, proxy node, bootstrap node) may be instantiated on the same communication device, and thus the processing device 350 and/or the memory 360 may be shared across multiple nodes.

Accordingly, when reference is made to communication device or node of the network 300, it is understood that each may be instantiated a software container, a virtual machine, a bare metal hardware device, or another logical device capable of being uniquely identified and authenticated as a separate communication node. Identity of the communication devices may also vary according to hierarchy as executed on a machine, such a server may have its own identity (e.g., that may be associated with a hypervisor) separate from those of applications running on the device (e.g., that may be associated with separate virtual machines).

In one embodiment, each node of the network 300 includes some type of information associated with the communication interface 370, or some other unique information, which is capable of serving as identification for each respective node. The identification information may include at least one of an internet protocol (IP) address, a text label (such as a Uniform Resource Indicator (URI)), a medium access control (MAC) address, or a trusted platform module (TPM) generated key of the communication device. A TPM generated key may be generated by a specialized chip on an endpoint device that stores RSA encryption keys specific to the host system for hardware authentication. Each TPM chip contains an RSA key pair called the Endorsement Key (EK). The key pair may be maintained inside the chip and cannot be accessed by software. A Storage Root Key (SRK) is created when a user or administrator takes ownership of the system. This key pair is generated by the TPM based on the Endorsement Key and an owner-specified password.

In various embodiments, some of the communication devices are legacy devices lacking appropriate self-identification capability in corresponding communication interfaces. In such a situation, the legacy devices may be retrofitted with a plugin (such as an application programming interface (API)) or other management module that is capable of interaction with the distributed database of the network 300. In this way, the plugin or management module may control and manage legacy security protocols, applications, and other technology for interface with other nodes of the network 300.

With additional reference to FIG. 3B, the multiple communication devices may communicate over a network medium 315 such as over one of a wired or a wireless connection to the network 300. Illustrated by way of example and for purposes of explanation is the first communication device 310A, which may further include an application 302 that runs on top of a secure platform 304, where the secure platform interfaces with the database portion 362, of the distrusted database, stored in the memory 360. In various embodiments, the secure platform 304 may be a hypervisor that controls a number of virtual machines or may be based on a third party platform. If a hypervisor, the application 302 may be one or more virtual machine representative of one or more of the multiple communication devices of the network 300.

If based on a third party platform, the secure platform 304 may include a modified version of a third party platform or be integrated to work with a third party platform such as Envoy or Linkerd. Linkerd is an open source network proxy designed to be deployed as a service mesh: a dedicated layer for managing, controlling, and monitoring service-to-service communication within an application. Envoy is a high performance C++ distributed proxy designed for single services and applications, as well as a communication bus and universal data plane designed for large micro-service service mesh architecture. Built on learning of solutions such as NGINX, HAProxy, hardware load balancers, and cloud load balancers, Envoy runs alongside applications and abstracts the network by providing common features in a platform-agnostic manner. When service traffic in an infrastructure flows via en Envoy mesh, it becomes easy to visualize problem areas via consistent observability, tune overall performance, and add substrate features in a single place.

In one embodiment, a proprietary portion of the secure platform 304 abstracts away the security layer and is made a part of the third party executable. The proprietary portion may further be configured as a security filter or a set of security filters. These security filters may express security policies that can be enforced at the application layer or at the transport layer itself of the network. Existing Hyper Text Transfer Protocol Secure (HTTPS) functions of the secure platform 304 may remain available. The security of the secure platform 304 may be configured, deployed, and updated separately from applications (such as the application 302) that run on the secure platform 304.

In various embodiments, the distributed database is made up of the aggregate of the database portions of the multiple communication devices of the network 300, which includes the database portion 362 of the first communication device 310A, which is illustrated. In one embodiment, the distributed database is a relational database such as Microsoft's SQL Server, Oracle Database, MySQL and IBM's DB2, for example.

Figure 4:
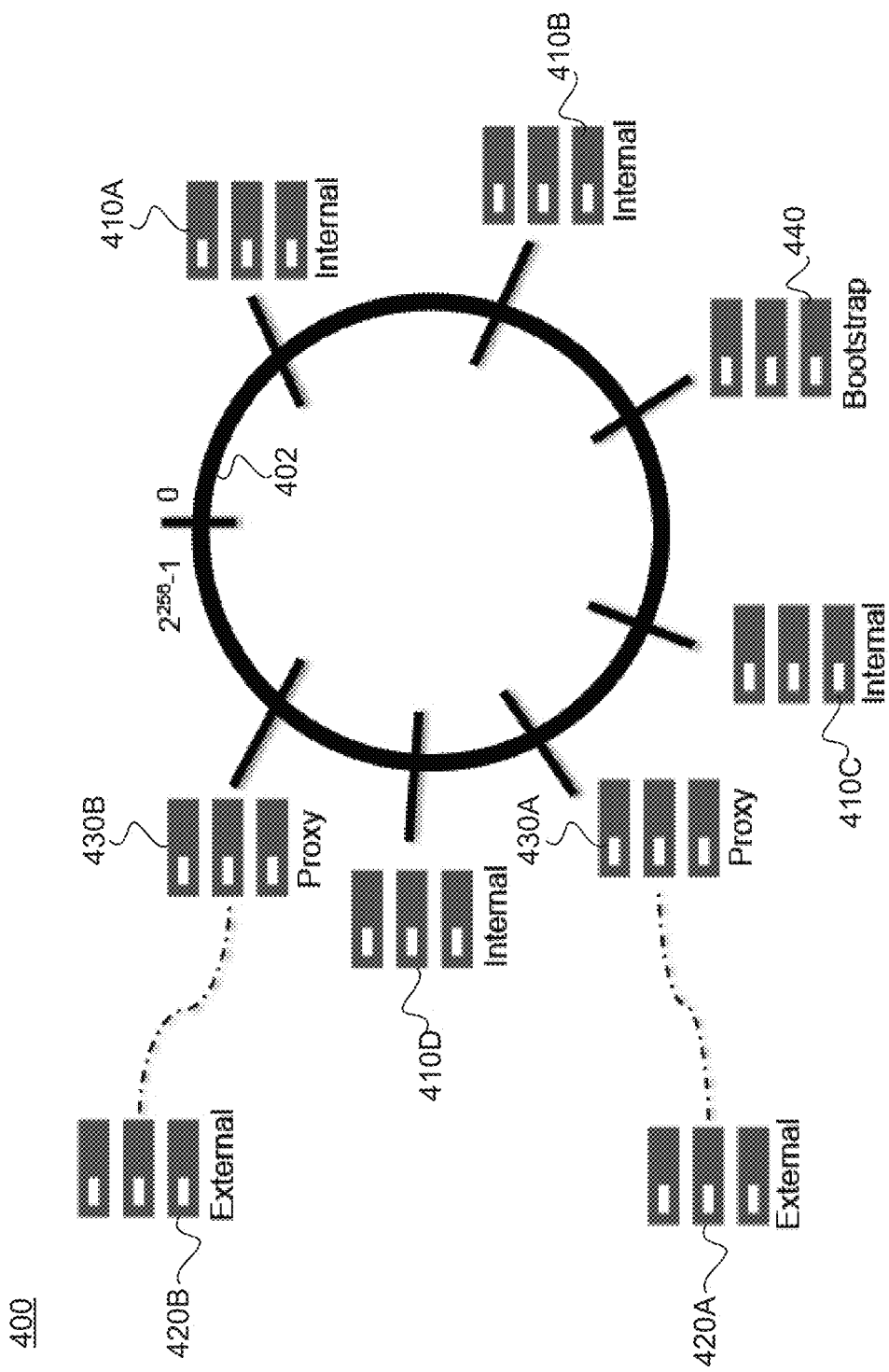
FIG. 4 is a block diagram of a network of distributed communication devices where the distributed database of FIGS. 3A-3B is implemented as a distributed hash table according to an embodiment.

In another embodiment, the distributed database is a distributed hash table (DHT) or a distributed ledger (associated with blockchain technology), which may be arranged in a ring of 0 to $2^{256}-1$ addresses (402 in FIG. 4). Each node of the network 300 may further be identified by its public key. In one embodiment, the hash of a node's public key is its database (or DHT) address in the network 300. Accordingly, each address of the DHT is determined via a hash of a public key assigned to a corresponding communication device of the multiple communication devices. Neighbor nodes may be those nodes with the closest database addresses (e.g., DHT addresses), which may be measured as within a threshold value of each other. Neighbor nodes may make up a subset of the nodes that have numerically closest database addresses, where the threshold value may be set in such a way as the subset is a manageable and securable number in terms of mutual authentication.

A DHT (or distributed ledger) can be viewed as a dictionary service distributed over a network that provides access to a common shared key/value data store, distributed over participating nodes with great performance and scalability. From a user perspective, the DHT provides a map interface, with two main operations: put(key, value) and get(key). Get is to retrieve values stored at a certain key while put (also called announce) is to store a value on the network associated with that key. Note that many values can be stored under the same key, which allows the present embodiments to build out authorizations provided as discrete permissions granted on a per-node basis. The Kadmelia DHT algorithm requires to contact only O(log(N)) nodes for a get operation, where N is the number of nodes in the network. This property makes DHTs very scalable as demonstrated, for instance, by the mainline BitTorrent DHT running with tens of millions of nodes.

FIG. 4 is a block diagram of a network 400 of distributed communication devices where the distributed database of FIGS. 3A-3B is implemented as a distributed hash table (DHT) according to an embodiment. The DHT may be arranged in a ring 402 of 0 to $2^{256}-1$ addresses. The network 400 may include a first communication device 410A, a second communication device 410B, a third communication device 410C, and a fourth communication device 410D acting as internal nodes. The network 400 may further include a fifth communication device 430A, acting as a proxy for a first external communication device 420, and a sixth communication device 430B acting as proxy for a second external communication device 420B. Because external communication devices achieve access to and communication with communication devices of the network 400 via a proxy node, the external communication devices 420A and 420B are not considered nodes on the network 400. The external communication devices 420A and 420B are therefore represented by the proxy nodes on the network 400. The network 400 may further include a seventh communication device 440 acting as a bootstrap node.

As discussed with reference to FIGS. 3A-3B, the distributed database may be a DHT, a portion of which is stored at each node. The nodes of the network 400 may be under direct administrative control (e.g., by the DHT and bootstrap nodes) and may be physically secure. The public key of each node may be hashed and stored in the DHT. Storing the public key of its neighbor nodes along with identification data of the neighbor nodes enables a node to authenticate (and be authenticated by) the closest or neighbor nodes in the DHT. See Tables 1 and 2 for example DHT entries, each of which may also include a permission or a meta-permission stored in relation to the public key of each respective node, to provide capability for specific authorizations. Note that closest addresses of the DHT (e.g., of the neighbor nodes) are not necessarily geographically nearby, but have a database address that is numerically within a threshold value of that of its neighbor node(s). A database address may be shifted to another IP address, MAC address, virtual machine, or TMP generated key for example, and thus has meaning primarily within the distributed database, although database keys may also be mapped onto a network topology in other embodiments and for other security or management purposes.

For purposes of explanation, assume the sixth communication device 430B, the first communication 410A, the second communication device 410B, and the third communication device 410C are neighbor nodes. Each of the sixth communication device 430B, the third communication device 310C, and the second communication device 410B may therefore authenticate the first communication device 410A for mutual communication with itself or other linked nodes of the network 400.

In another embodiment, the first communication device 410A authenticates the second communication device 410B for a first interaction and to facilitate mutual authentication for the two communication devices to interact as trusted nodes. For example, the processing device 350 of the first communication device 410A is to authenticate a first interaction with the second communication device 410B of the multiple communication devices. To authenticate the first interaction, the processing device 350 is to send first identification data (and optionally) a first public key to the second communication device 310B with which the second communication device is to authenticate the first communication device 310A in view of information stored in the distributed database. If the first public key is not also sent, the second communication device may perform a lookup in the distributed database to determine the first public key.

The processing device 350 may further receive second identification data (and optionally a second public key) from the second communication device 410B. If the second public key is not received, the processing device 350 may retrieve, using the second identification data, the second public key associated with the second communication device. The processing device 350 may further determine that the second identification data and the second public key are stored in relation to each other in one of the first portion of the database or a second portion of the database stored in a third communication device (e.g., the sixth communication device 430B or proxy node) of the multiple communication devices. The third communication device may have a third database address that is numerically within the threshold value of a first database address of the first communication device 410A.

The processing device 350 may further verify, based on a permission stored in relation to the second public key (or the second identification data), that the second communication device is authorized to engage in the first interaction with the first communication device 410A. More specifically, the processing device may verify that an action associated with an access request, by the second communication device 410B, matches a permission associated with the node type. For example, to verify authorization to engage in the first interaction, the processing device 350 may further verify a signature applied to the permission, where the signature is associated with a portion of a genesis key used to encode the permission into the database. In a further embodiment, the signature may be associated with a second permission of the second communication device, but where the second permission is traceable through one or more additional permissions (e.g., associated with one or more other communication devices) ultimately to a portion of a genesis key used to encode the permission into the database. In this way, a chain of permissions may be established through which any given internal node may authorize a permissions stored in relation to a public key and/or identification data of a particular other internal node.

This mutual authentication and authorization to engage in a particular interaction enables the establishment of a community of trust, and this trust may be extended transitively to additional nodes as will be discussed in more detail with reference to FIG. 5. Furthermore, when each communication device is added to the network 300 or 400, the bootstrap node (illustrated as the seventh communication device 340 or 440) may do so using a genesis public key (or a public portion of the genesis key) that provides specific roles and permissions to each node, as will be discussed in more detail with reference to FIGS. 6A-6B. For example, the bootstrap node may designate any node as an internal node or as a proxy node. An internal node can identify itself as such to any other node. Authorization data for each node is available to internal nodes, and nodes that are located a distance away from each other in the DHT may establish a chain of trust with intervening nodes. Proxy nodes and bootstrap nodes are internal nodes with additional duties as described herein.

Figure 5:
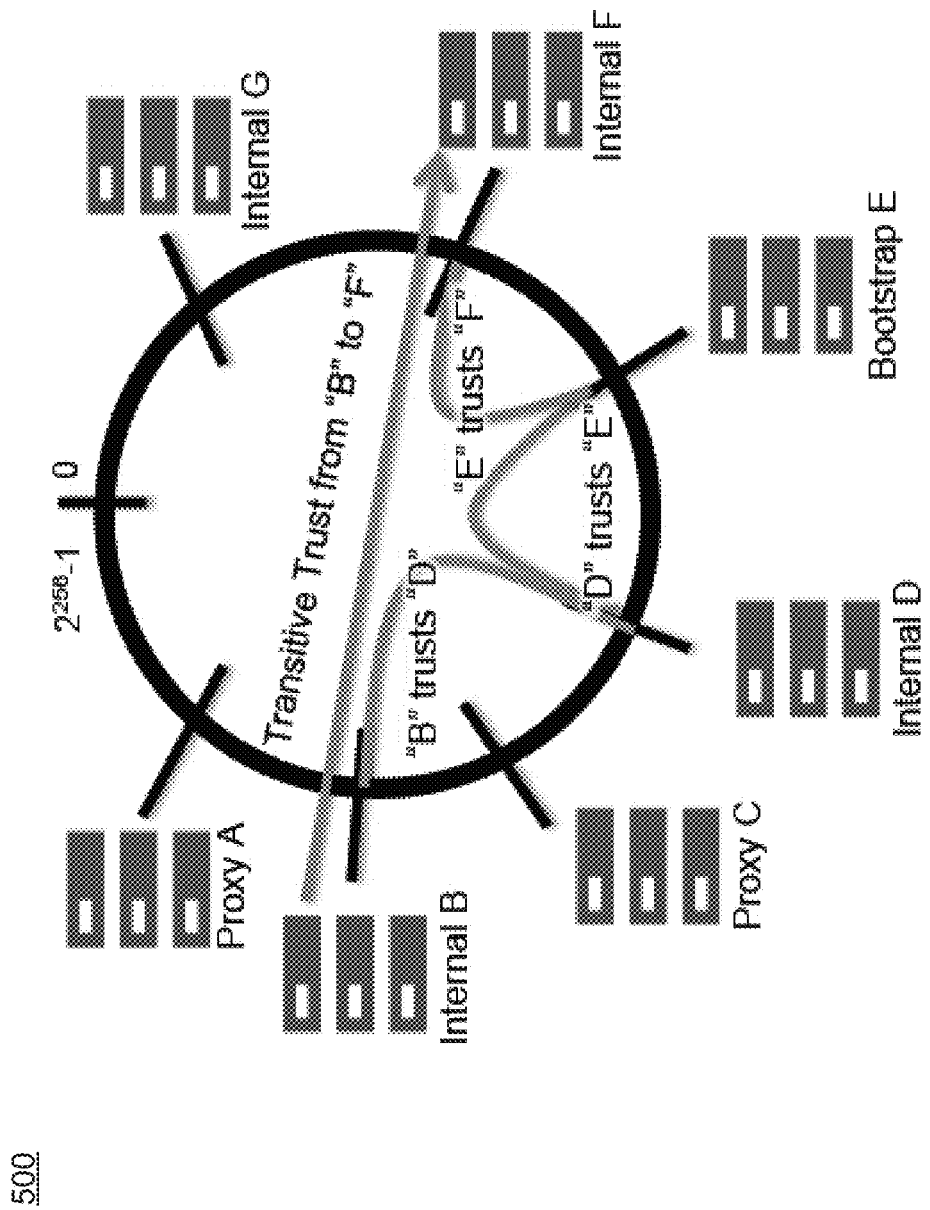
FIG. 5 is a block diagram of a network of distributed communication devices illustrative of transitive trust created across a chain of the communication devices according to an embodiment.

FIG. 5 is a block diagram of a network 500 of distributed communication devices illustrative of transitive trust created across a chain of the communication devices according to an embodiment. For providing immediate trust, the database portion (e.g., 362 of the first communication device 310A) of each node may store the public key of that node as well as the identification data and public keys of a subset of neighbor nodes. When trust (e.g., authentication) is to be gained of a node that is farther away (e.g., not a neighbor node in terms of database addresses being within a threshold value of each other), then transitive trust may be established through a chain of trusted nodes. A particular node may seek to establish trust for a particular interaction, such as, for example, to receive data (e.g., via a get operation), to send data (e.g., via a put operation), access a service, or to authenticate another communication device for electronic interaction with the requesting node. The type of interaction allowed may be established by permissions stored in relation to an authenticated node in the distributed database (e.g. DHT).

Illustrated by way of example in FIG. 5, assume internal node B wants to determine whether internal node F is trusted, e.g., by making an access request of internal node F. Internal node B knows (e.g., via a lookup in the distributed database such as a database portion of a neighbor node) that internal node D is an internal node, e.g., is a neighbor node of internal node B. Table 1 is an illustrative example of a database portion of the DHT stored on node D. Internal node B may then ask internal node D if internal node F is an internal node. Internal node D knows that bootstrap node E is an internal node, e.g., is a neighbor node of internal node D. Internal node D asks bootstrap node E if internal node F is an internal node. Bootstrap node E knows that internal node F is an internal node, e.g., a neighbor node of bootstrap node E, thereby establishing transitive trust from internal node F back to internal node B along the chain of nodes illustrated in FIG. 5. Once this transitive trust is established, internal node F may directly communicate and interact with internal node B according to permissions associated as between the internal node F and bootstrap node E, which are also stored in the distributed database. This may be facilitated by the internal node F and the internal node B establishing a session key, which may be encrypted before transmission using one of internal node B's public key or internal node F's public key. Alternatively, the session key can be generated using Diffie Hellman, or similar algorithm. A communication session may then be established between internal node F and internal node B using one or more session keys are previously discussed.

TABLE 1

| D Public Key: | 7d8e2f32 |
|---|---|
| Node: | Internal |
| Type: | Participant |
| Service: | Service D |
| C Public Key: | 9823e67 |
| Node: | Proxy |
| Type: | Client |
| E Public Key: | 98c36c99 |
| Node: | Bootstrap |
| Type: | Signature |
| Permission: | Service D |
| Meta-permission: | New node |
| | New permission |

Queries (or access requests) such as sent out by internal node B that generate further queries by other nodes to determine transitive trust may be resolved with log(N) queries, where N is the number of nodes in the network 500. A permission stored in a database portion of the distributed database (e.g., the portion stored in bootstrap node E) may further provide authorization for a certain type of interaction with internal node F. This permission may be stored in relation to the public key or identification data of internal node F stored on the database portion of bootstrap node E.

Further by way of example, assume that proxy node A is to communicate with internal node D in order to access Service D of internal node D. In one embodiment, the proxy node A speaks (e.g., authenticates) on behalf of an external node (such as the external communication devices 420A or 420B). Authentication, however, does not extend authorization to perform anything for which proxy node A itself does not have permission. The proxy node A may include DHT entries (which may also be stored in the database portions of internal node G and internal node B) as illustrated in Table 2 by way of example. The permissions saved in relation to the public key of the proxy node A include "Connect to Service D." In various examples, Service D is a web server, a video archive, an email server or the like. This is a node-specific permission to ensure limited authorization and maximum security in terms of what proxy node A is allowed to do on the network 500. Once authentication is established with internal node D during a session, further communication in connecting to Service D on internal node D by proxy node A may be direct.

TABLE 2

| A Public Key: | 1972c4e8 |
| --- | --- |
| Node: | Proxy |
| Type: | Client |
| Service: | Service A |
| Permissions: | Connect to Service D |

Also illustrated in Tables 1 and 2 are the concepts of node classification and type. For example, internal node D is classified as "internal," and is of type "participant." Further, internal node C is classified as "proxy," and is of type "client." Further, bootstrap node is classified as "bootstrap," and is of type "signature." The "signature" of the bootstrap node (e.g., a genesis signature) indicates authority to assign permissions to other nodes, signing those permissions with use of a public key portion of its genesis key. Each classification or type of node may carry with it a pre-determined set of permissions.

When a first node wants to look up information associated with a second node, e.g., to authenticate the second node, the first node may hash the permissions or the public key (or some combination thereof) of the second node and then look up the database address that is closest to the resultant hash value. The first node may then contact the second node to authenticate this information, e.g., the public key or permissions associated with that public key. If there is a match in the distributed database for this information associated with the second node, the second node is authenticated, and an interaction with the second node may proceed.

In an embodiment in which the internal nodes of a network include a hypervisor and multiple virtual machines, the virtual machines (VMs) conveniently build on top of trust already present between each virtual machine and the hypervisor that manages and controls those virtual machines. For example, a virtual machine may be pre-configured as a node on the network 300 or 400, and additional features of a virtual machine may be built on that pre-configuration. In this way, one physical machine may instantiate the hypervisor and multiple virtual machines. The hypervisor may provide the advantages of a distributed database (such as a DHT), where the hypervisor (which may act as a bootstrap node) and VM nodes trust certain pieces of basic information due to the trust already put in place between trusted VMs and the hypervisor. The network may then be expanded via a trusted exchange between hypervisors of different physical machines.

Figure 6A:
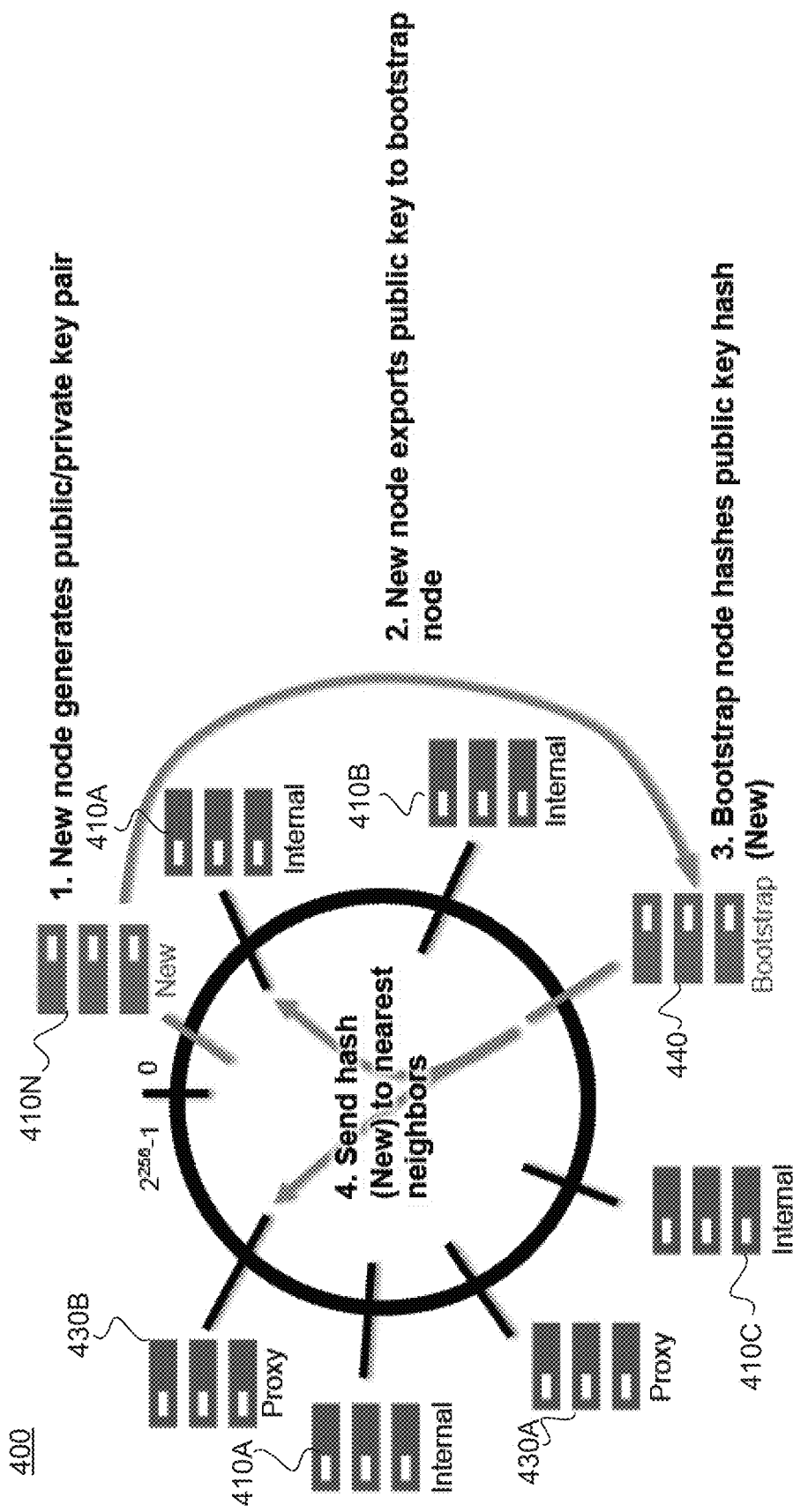
FIGS. 6A and 6B are a block diagram of a network of distributed communication devices in which a bootstrap node is employed to add a new, trusted communication device to the network according to an embodiment.
Figure 6B:
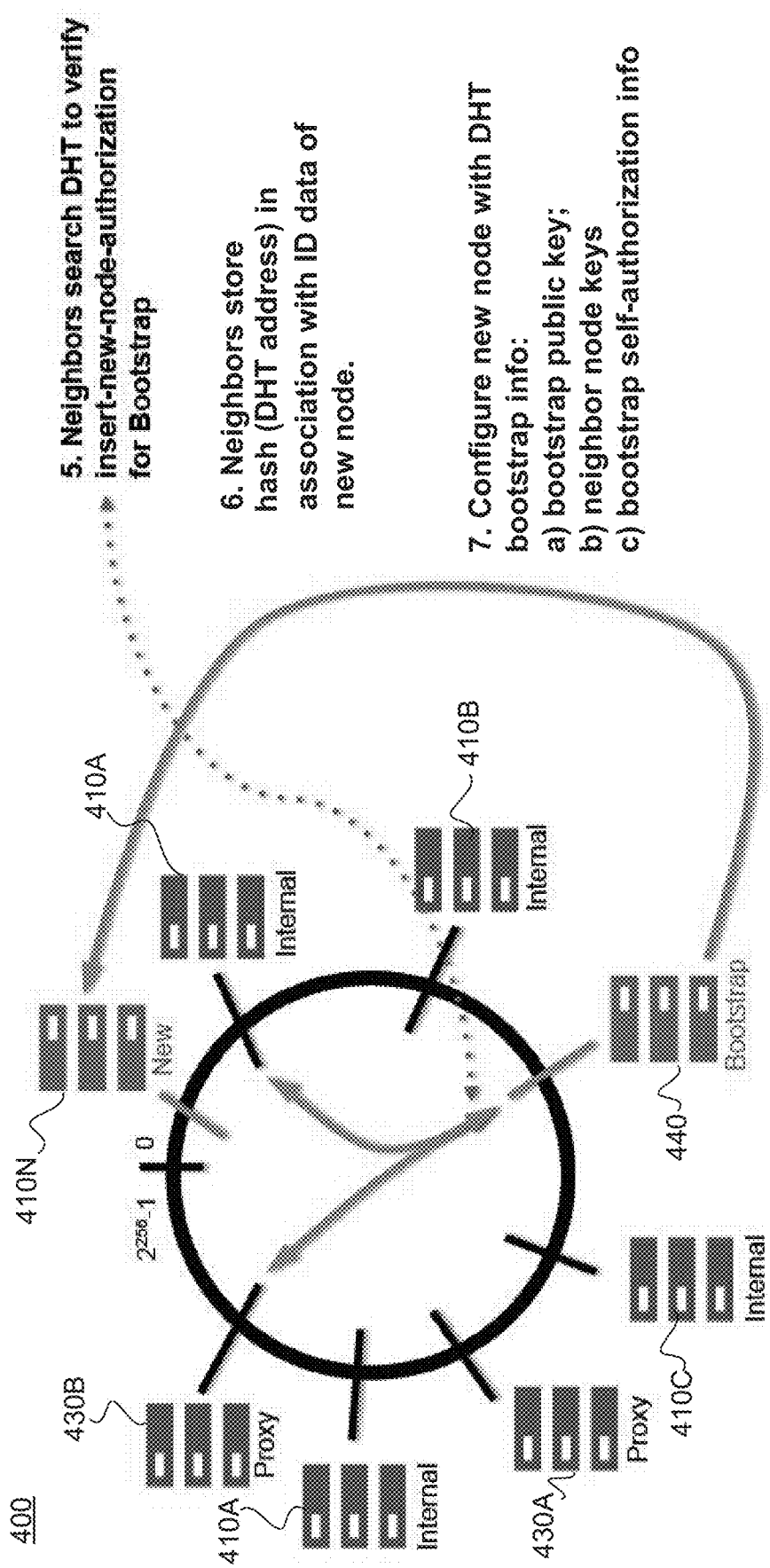

FIGS. 6A and 6B are a block diagram of the network 400 of distributed communication devices in which the bootstrap node (e.g., seventh communication device 440) is employed to add a new communication device 410N as a new (trusted) node to the network 400 according to an embodiment. In one embodiment, the bootstrap node is physically connected to the network 400 long enough to bring the new node online, and then the bootstrap node is taken offline, to prevent any potential rouge use of the bootstrap node by an attacker. As a further embodiment, the bootstrap node may first configure the new node offline, and then the bootstrap node and new node are brought online to perform associated updates to the distributed database. Once again, in this further embodiment, the bootstrap node may still be removed physically from the network 400 once the new node is up and operational as an internal node to the network 400.

To configure the new node, the new communication device 410N may first generate a public-private key pair (to include a first public key) (step 1) and send the public key to the bootstrap node (step 2). The bootstrap node may further hash the public key to determine where in the distributed database to locate the new node, e.g., generate a new database address for the new node (step 3). The bootstrap node may further send the new database address to the sixth communication device 430B and the first communication device 410A, which are neighbor nodes (step 4). The new database address may also be sent to further neighbor nodes that contain addresses within a threshold value of the new node, as was discussed previously.

With continued reference to FIG. 6B, the nearest neighbor nodes may each receive the new database address with identification data of the new node within a put command from the bootstrap node. The neighbor nodes may further authenticate, via access to a bootstrap public key, the seventh communication device 440 as the bootstrap node. The bootstrap public key may be the public key portion of the genesis key (e.g., genesis public key) that the bootstrap node may use in forming a node of each communication device that is brought onto the network 300 or 400 in a trusted state. Accordingly, each communication device of the network may store the genesis public key with which it may be able to authenticate the bootstrap node and authorize the creation of the new node (step 5). In the alternative, the bootstrap public key may be stored, in the distributed database, in relation to a permission of the bootstrap node that authorizes the bootstrap node to create a new node and also to assign permissions to any internal node.

The neighbor nodes may then store, in further portions of the distributed database, the database address (e.g., the hash of the public key) in association with the identification data of the new node (step 6). The bootstrap node may further, or concurrently, configure the new communication device 410N with bootstrap information and other data to completely bring the new communication device 410N onto the network 300 or 400 as the new node (step 7). This last step may include storing the genesis public key in the memory of the new node (step 7a), storing the public keys of the neighbor nodes (step 7b), and storing any additional bootstrap self-authorization information beyond the bootstrap public key (step c). The public keys in step 7b may include, for example, the first public key of the first communication device 410A, which is stored in relation to the first database address of the first node, and the sixth public key of the sixth communication device 430B, which is stored in relation to the six database address of the sixth node. The bootstrap node may also store permissions for the new node in relation to the public key or identification data of the new node stored in the database portions of the first communication device 410A and the sixth communication device 430B.

These permissions may also be signed with the genesis public key, e.g., with a signature of the bootstrap node. The permission may then later be verified by a neighbor node that stores the permission via the signature, which is associated with the public key portion of a genesis key used to encode the permission into the distributed database. In the alternative, the neighbor node may look up the address of the bootstrap node in the distributed database (e.g., via a hash of the bootstrap public key), and verify a bootstrap permission associated with the bootstrap node, e.g., a permission to create a new node or to assign a new permission to any internal node.

Figure 7:
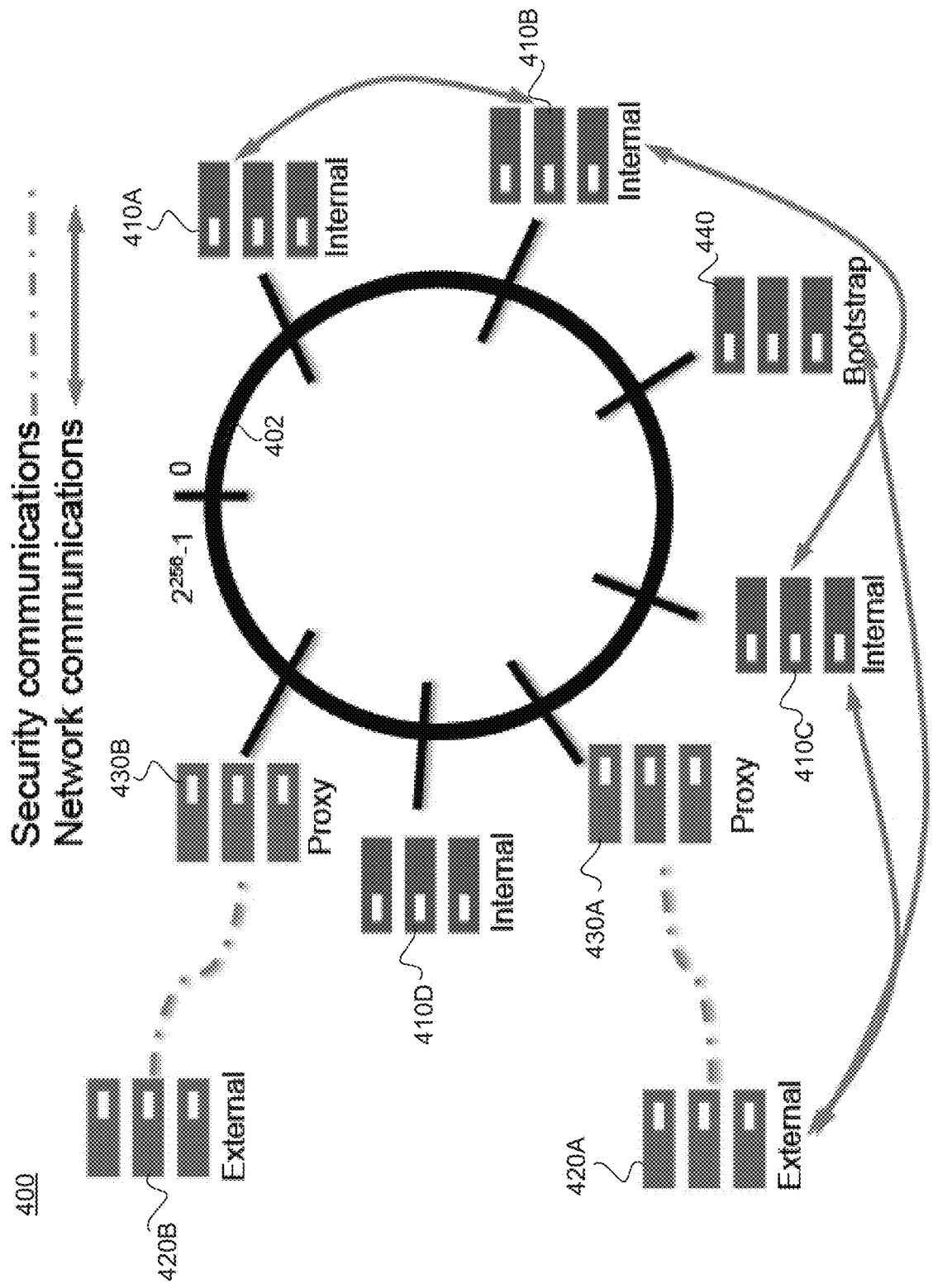
FIG. 7 is a block diagram of a network of distributed communication devices in which security communications between external nodes and proxy nodes is distinguished with network communications according to an embodiment.

FIG. 7 is a block diagram of the network 400 of distributed communication devices in which security communications between external nodes and proxy nodes is distinguished with network communications according to an embodiment. For example, the first external communication device 420A and the second external communication device 420B may be outside of administrative and physical control. Accordingly, external communication devices are not permitted to perform actions with reference to the distributed database (e.g., DHT).

Instead, each external communication device is represented by an internal proxy node and is provided permissions only as far as permissions assigned to the internal proxy node. As illustrated, the fifth communication device 430A (first proxy node) may represent and authenticate the first external communication device 420A to another of the multiple communication devices that make up internal nodes of the network 400. Further, the sixth communication device 430B (second proxy node) may represent and authenticate the second external communication device 430B to another of the multiple communication devices that make up internal nodes of the network 400. As illustrated, once the first proxy node has authenticated the first external communication device 420A to a neighbor node (such as the third communication device 410C and the seventh communication device 440), the first external communication device 420A may communicate with these neighbors nodes over the network medium 315 (indicated with darkened arrows in FIG. 7). These neighbor nodes may provide further authentication transitively (see FIG. 5) as would have happened on behalf of the fifth communication device 430A, providing further extension of the ability of the first external communication device 420A to communicate with additional internal nodes of the network.

In some embodiments, the proxy nodes may provide legacy support (e.g., communicate via HTTPS or a federation mechanism) where one of the external communication devices 420A or 420B is a legacy device. The proxy nodes may also proxy business communication through envoy mesh, if desired. A federation mechanism may employ common standards and protocols, including SSL/TLS or Kerberos, across organizations (and security domains) via trust relationships, which may be established via digital signatures, encryption, and PKI. In some embodiments, this is another way an IoT device is inserted into the network. Maybe the IoT device cannot be updated with a plugin. The IoT device may always be an unintelligent, insecure device. But if the IoT device is set up to only communicate to the network through a proxy node, the network deployed security can mitigate a threat from the IoT device.

The integrity of the distributed database, such as a DHT, may be ensured by way of proper authorization for modifications to the distributed database. This may include write authorization, e.g., to write permissions for nodes into the database. Root authorization may be provided via the genesis key of a bootstrap node that automatically carries with it a list of certain permissions, including write permissions. The use of the genesis key within the network 400 may be long enough to load a few permissions into the DHT for impacted internal nodes, and then the bootstrap node using the genesis key may be taken offline to further safeguard the security of the bootstrap node. This is because the internal nodes trust the genesis key, as changes in the distributed database can be traced back to the genesis key. When a node is brought online, it is done with the node knowing the public key portion of the genesis key. The bootstrap node may give the new node the public key portion as part of bootstrapping. The public key portion of the genesis key may be passed in a hardware security module, or some other secure container to pass the "public key" of the genesis node in a secure manner. Furthermore, whenever new data is written into the distributed database, it is to be signed by the author, e.g., with the public key portion of the genesis key. Other nodes can then check to see that the bootstrap (or other authorized) node that signed the permission had the authorization to make that change, which can be traced back to the genesis key.

In various embodiments, the integrity of the genesis key is further ensured via frequent changes to the genesis public key, e.g., on a schedule or from time to time. The schedule may be randomized to make it difficult to predict when the genesis public key will be changed. When changed, the genesis public key is reassigned and sent out to all trusted nodes to replace a previous version of the genesis public key. In this way, the genesis public key is less likely to be compromised. Furthermore, if a network entity (e.g., an internal node) suspects the genesis private key has been compromised, the network entity may send a notification to the bootstrap node to generate a new genesis public key in addition to changing the genesis private key.

The integrity of the distributed database (e.g., DHT) may further be ensured by way of requiring proper authorization for DHT, including introducing new nodes, modifying identity/authentication data, and modifying authorization data. To break authorization recursion, an identification of a node may be "self-authorizing." The "genesis key" may provide this capability. Self-authorization means that the node may prove that it has the genesis key by signing data with a proper current genesis public key. A split-key (e.g., a split public key) may also be employed, which is similar to a key share where machines are brought together in order to bring the public key back together. This embodiment may require computers that represent nodes to be locked down and taken offline.

The proposed trust model may further rely on a single entity having control of internal nodes, such as the bootstrap node discussed herein. In other words, the security model cannot allow rouge node(s) to introduce additional malicious node(s) to the network 400 or to change authorization data. This may be controlled via use of the bootstrap node and genesis key as discussed herein, which provide internal security to the network 400 that may be resilient to outside attack. Furthermore, threat of an insider attack may be removed by running the distributed database process as an application for which only administrators have access, e.g., the same security as denying users "root" or privileged access.

Further, in terms of an active attacker that attempts to hack in externally of the network, the attacker will be rejected access without the ability to insert a public key into the distributed database. Because an attacker does not have a legitimate public key, the attacker would have to attempt access via a bootstrap node, but this would require the genesis private key, which is unlikely due to heightened security of the bootstrap node. This reduces focus of security risk from outside attack to the bootstrap nodes. As discussed, the bootstrap nodes may be taken offline and not even be available most of the time. Furthermore, the security of the bootstrap nodes may be adjusted depending on level of concern about attack or level of sensitivity (or classification) of the network. The higher the concern about attack or the more classified the information, the bootstrap nodes may be configured with less automation and forced to be managed in a more manual way. This may be acceptable particularly where the bootstrap nodes may only be online for a period of time long enough to bring a new node into the network and/or assign additional permissions.

Figure 8A:
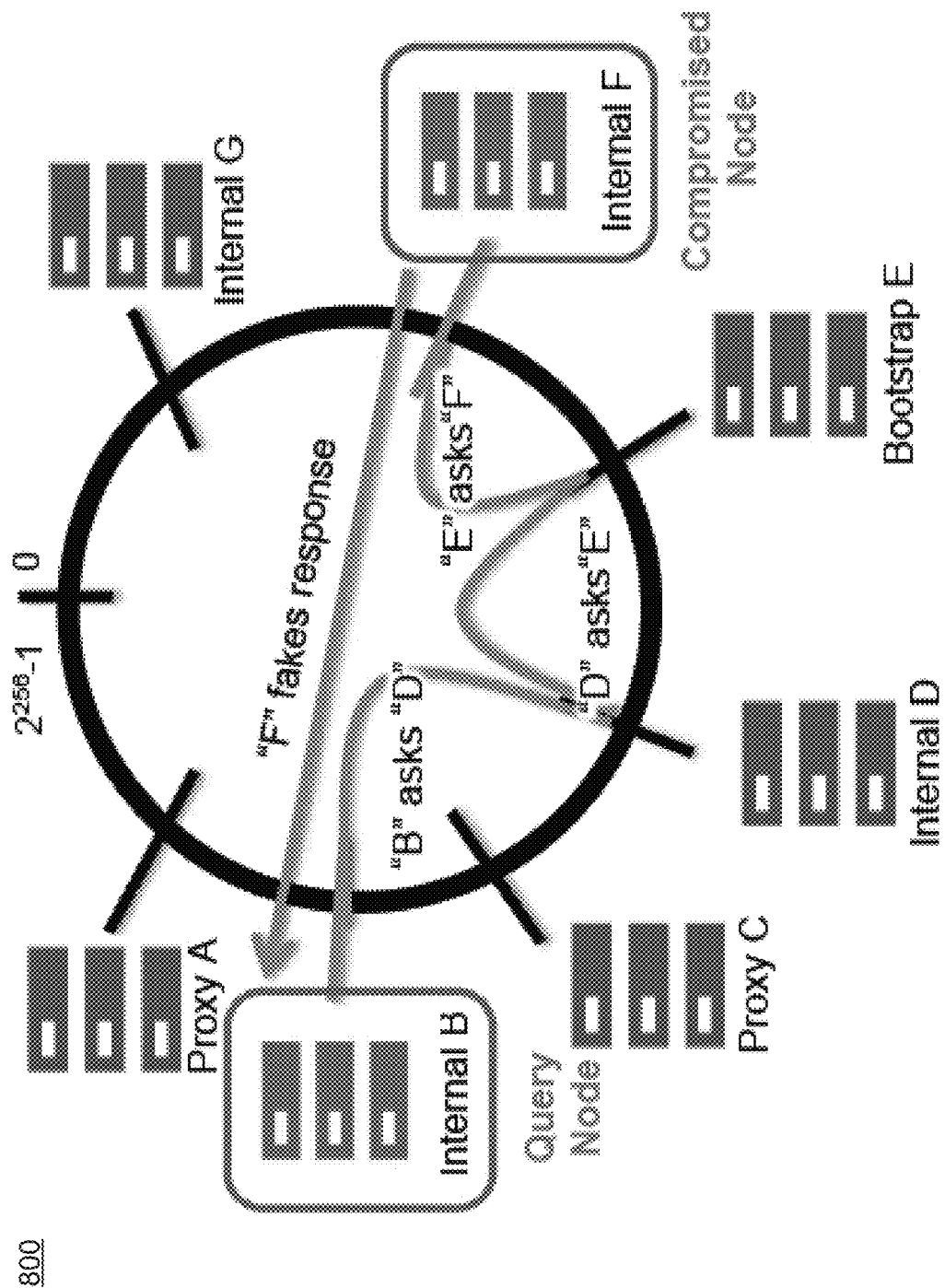
FIGS. 8A and 8B are a block diagram of a network of distributed communication devices in which redundant lookups of a distributed database prevent the risk of a foothold attacker infiltrating the network according to an embodiment.
Figure 8B:
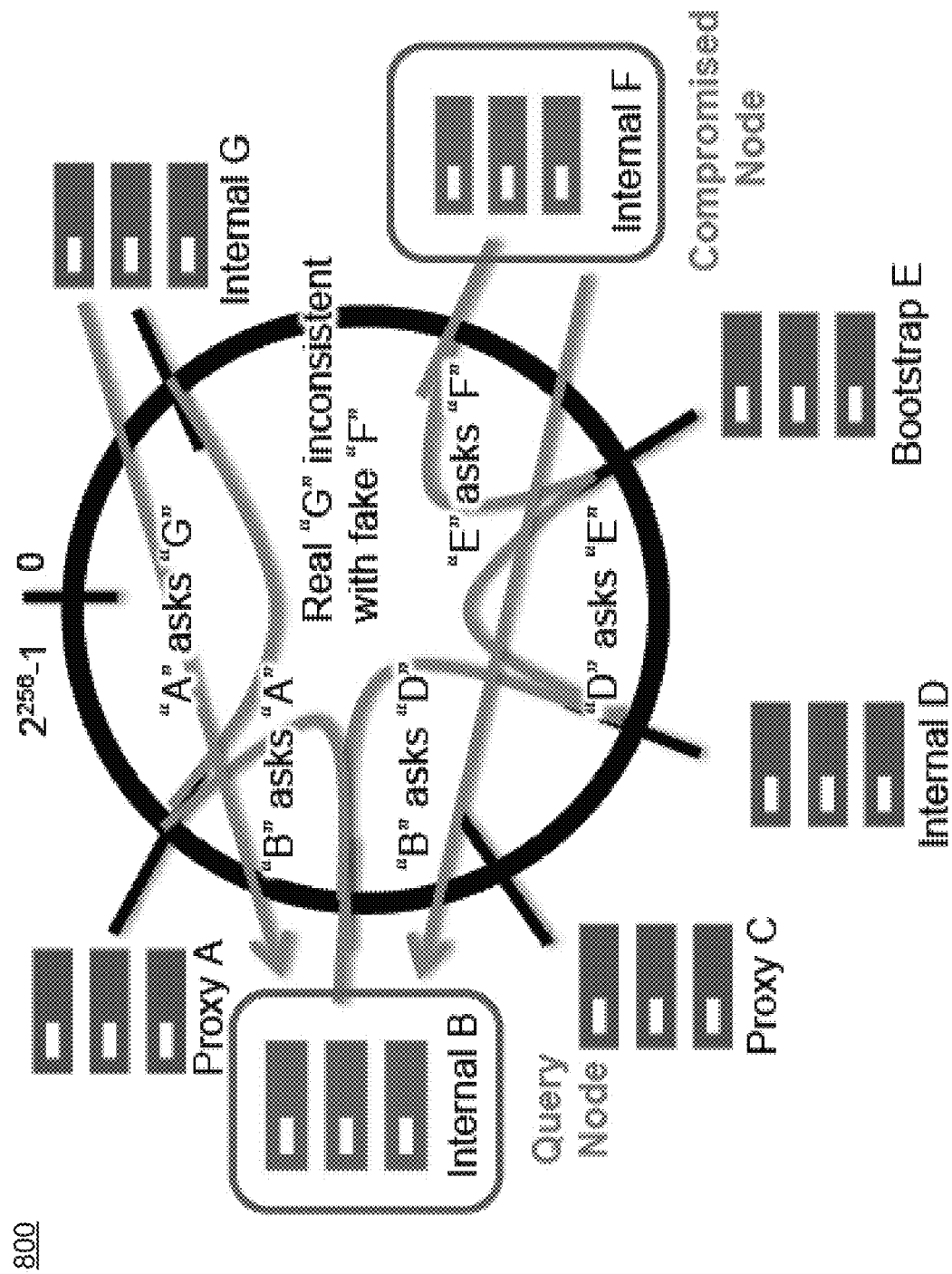

FIGS. 8A and 8B are a block diagram of a network 800 of distributed communication devices in which redundant lookups (FIG. 8B) of a distributed database prevent the risk of a foothold attacker infiltrating the network according to an embodiment. Illustrated in FIG. 8A is an internal node B that queries to access data from internal node F, as was the case in the network 500 of FIG. 5. In this case, however, assume that internal node F is compromised with corrupted data but still fakes a response to internal node B. In this situation, the comprised internal node F could feed corrupted data to the internal node B. The authentication data is spread out over the distributed database, so an internal node may query from n different lookups simultaneously to catch whether an attacker is trying to access the distributed database. For example, if the attacker has control of n internal nodes, the attacker could do considerable damage under some conditions. With naïve implementation, the attacker could corrupt key-value lookups. If lucky (e.g., has right address), the attacker can control critical info and potentially insert or delete key/value pairs.

With additional reference to FIG. 8B, the security model may enforce redundant lookups to ensure that data received in response to a query is not corrupted. In FIG. 8, internal node B makes a redundant lookup via proxy node A to internal node G. Internal node B determines that the response from the internal node G is inconsistent with the response from internal node F, and can send an alert to other nodes that there is a possible compromised node in the network 800. Internal nodes may react to such an alert by flushing their database portion of the distributed database, their own pinned public key pairs, and any public key portion of the genesis key so that these internal nodes will need to be brought onto the network again with fresh authentication and authorization data. In this case, the network gains intelligence about the communication of the assumed nodes and can feed and/or receive data from a security information and event manager (SIEM) or a security metric as an additional construct to prevent malicious activity inside the network. The bootstrap process also takes n paths, and for the attacker to fake responses to redundant lookups, would also have to compromise n internal nodes (one node in each path), which would be very difficult. Redundant lookups may involve redundant handshakes, which are performed during the identity phase of authentication.

Figure 9:
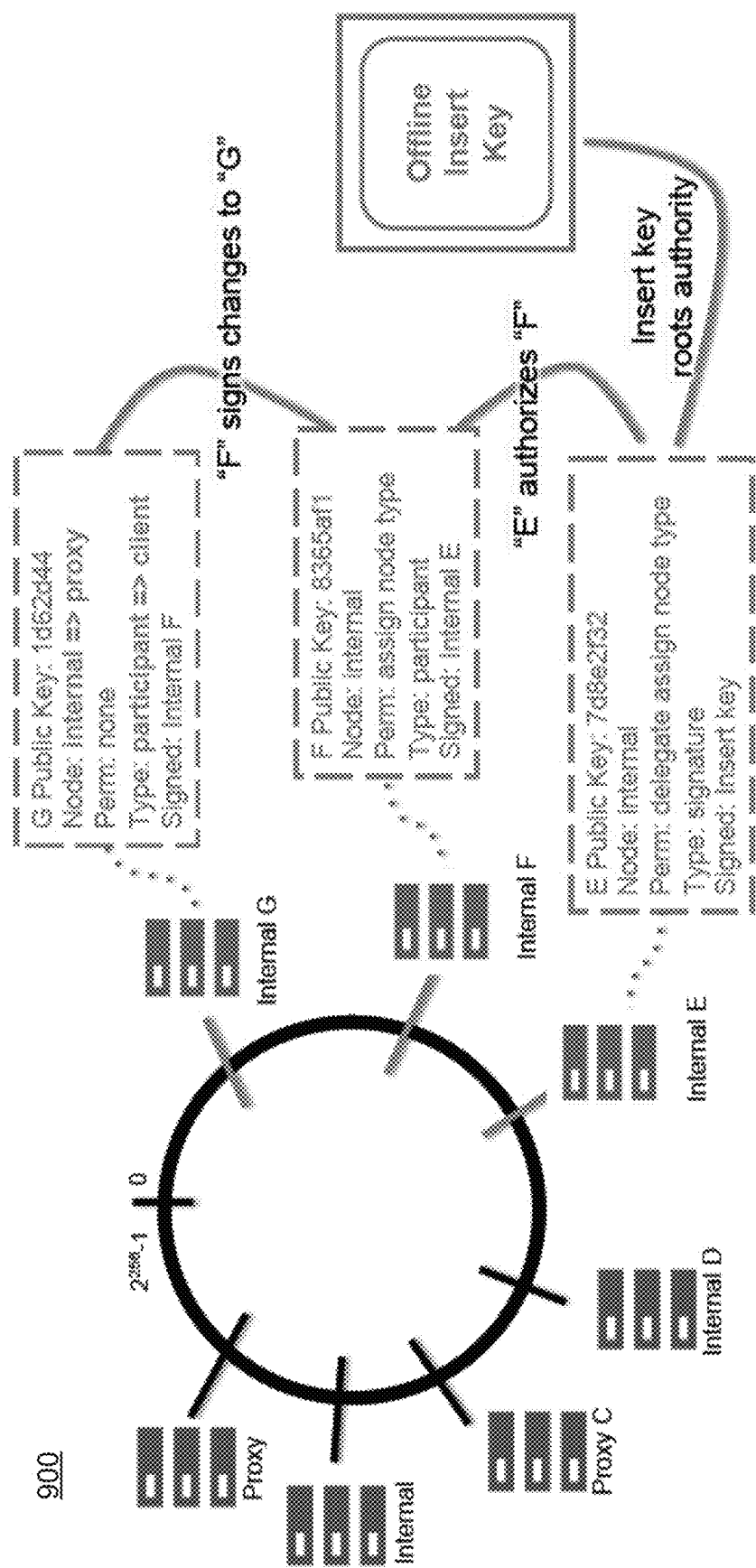
FIG. 9 is a block diagram of a network of distributed communication devices in which application of a digital signature using a public portion of a genesis key authenticates permissions assigned to a network internal device according to an embodiment.

FIG. 9 is a block diagram of a network 900 of distributed communication devices in which application of a digital signature using a public portion of a genesis key authenticates permissions assigned to a network internal device according to an embodiment. Offline, the genesis key may insert root authority to internal node E, which is of type "signature" in one embodiment. The type "signature" of a node may signify having the power provided by the public key portion of the genesis key to generate new nodes, make node type assignments, and authorize certain permissions. The internal node E may or may not be a bootstrap node, e.g., any internal node may be granted the powers to perform select configuration changes within other internal nodes of the network 800. These powers may be temporary and so may be revoked once completed.

As illustrated in FIG. 9, the root authority granted internal node E includes the permission of delegating the assignment of node type. In this situation, the internal node E may be allowed to delegate to internal node F the permission of assignment of node type. Accordingly, internal node F may further sign a change in node classification of internal node G, e.g., from internal node G to proxy node G, and from node type of "participant" to "client." The signature may carry with it the permissions granted by way of the public portion of the genesis key. In this way, offline insertion of the genesis key to the bootstrap internal node E may lead to further configuration of node type of internal node G. Each node in the network 800 may have stored locally (e.g., when brought online as a trusted node) the public portion of the genesis key in order to authenticate the validity of the signature used at the time of change of configuration.

Figure 10A:
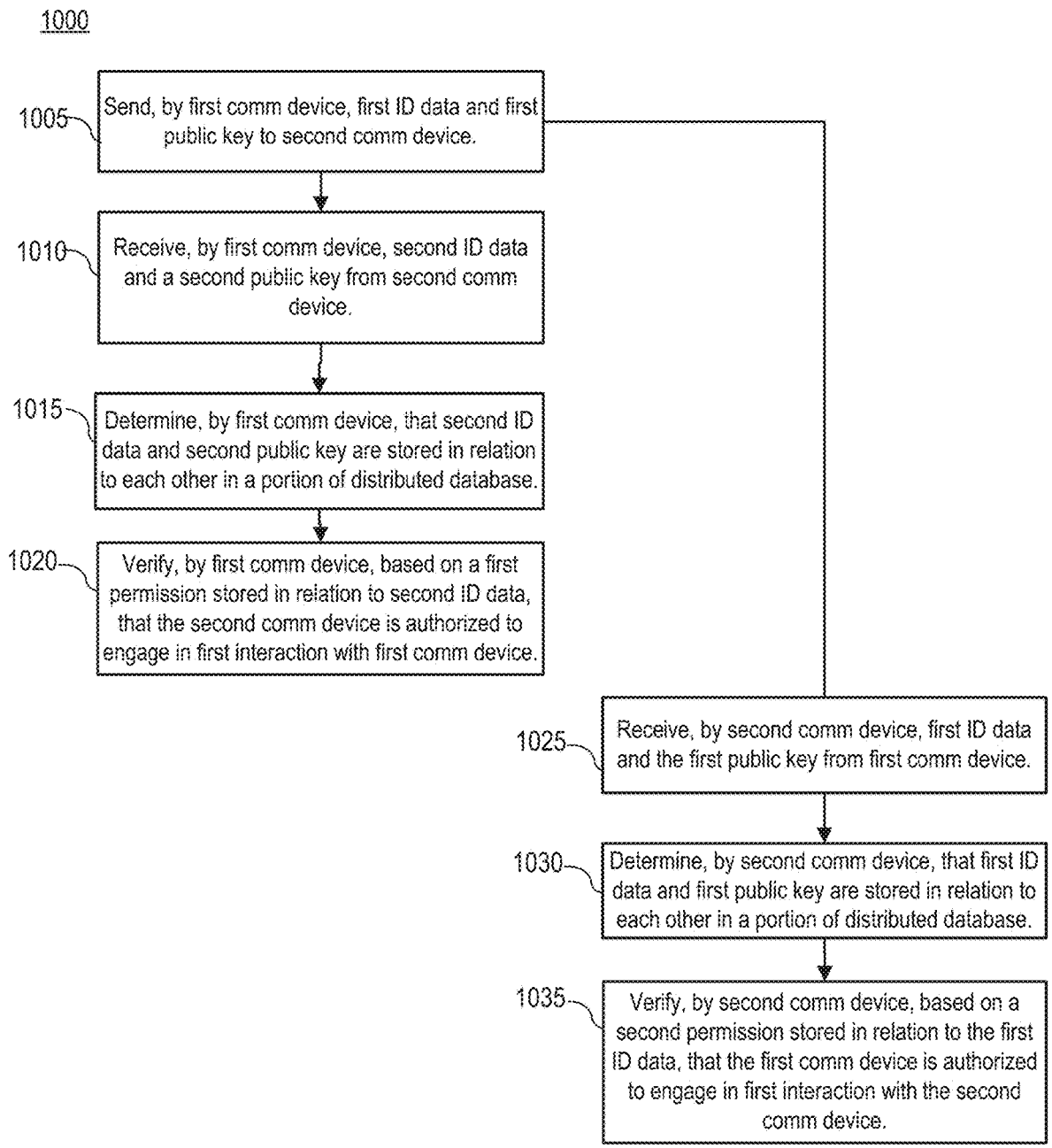
FIG. 10A is a flow chart of a method for distributed authentication between network nodes of a network according to an embodiment.

FIG. 10A is a flow chart of a method 1000 for distributed authentication between network nodes of a network according to an embodiment. In the particular embodiment of FIG. 10, the method 1000 may establish mutual authentication of a first interaction between first and second communication devices of the network. In various embodiments, the first interaction may be at least one of receive data, send data, access a service, or authenticate a third communication device, of the multiple communication devices, for electronic interaction with the second communication device. The method 1000 may be performed by processing logic that may comprise hardware (e.g., circuitry, dedicated logic, programmable logic, microcode, etc.), firmware, or a combination thereof. In one embodiment, method 1000 is performed by processing device 350 of FIG. 3A in each of the first communication device 310A or 410A and the second communication device 310B or 410B.

With continued reference to FIG. 10A, the method 1000 may begin with the processing logic of the first communication device sending first identification data and a first public key to the second communication device with which the second communication device is to authenticate the first communication device in view of information stored in a database distributed throughout the multiple communication devices (1005). The method 1000 may continue with the processing logic of the first communication device receiving second identification data and a second public key from the second communication device (1010). The method 1000 may continue with the processing logic of the first communication device determining that the second identification data and the second public key are stored in relation to each other in one of a first portion of the database, stored in the first communication device, or a third portion of the database, stored in a third communication device of the multiple communication devices (1015). In one embodiment, the third communication device has a third database address that is numerically within a threshold value of a first database address of the first communication device. The method 1000 may continue with the processing logic of the first communication device verifying, based on a permission stored in relation to the second identification data, that the second communication device is authorized to engage in the first interaction with the first communication device (1020). In one embodiment, the first communication device may further verify a signature applied to the permission, wherein the signature is associated with a public key portion of a genesis key used to encode the permission into the database.

With additional reference to FIG. 10A, the method 100 may also, concurrently or sequentially, continue with the processing logic of the second processing device receiving the first identification data and the first public key from the first communication device (1025). The method 1000 may continue with the processing logic of the second communication device determining that the first identification data and the first public key are stored in relation to each other in one of a second portion of the database, stored in the second communication device, or a fourth portion of the database, stored in a fourth communication device of the multiple communication devices (1030). In one embodiment, the first communication device has a first database address and the fourth communication device has a fourth database address that are numerically within the threshold value of a second database address of the second communication device. The method 1000 may continue with the processing logic of the second communication device verifying, based on a second permission stored in relation to the first identification data, that the first communication device is authorized to engage in the first interaction with the second communication device (1035).

Figure 10B:
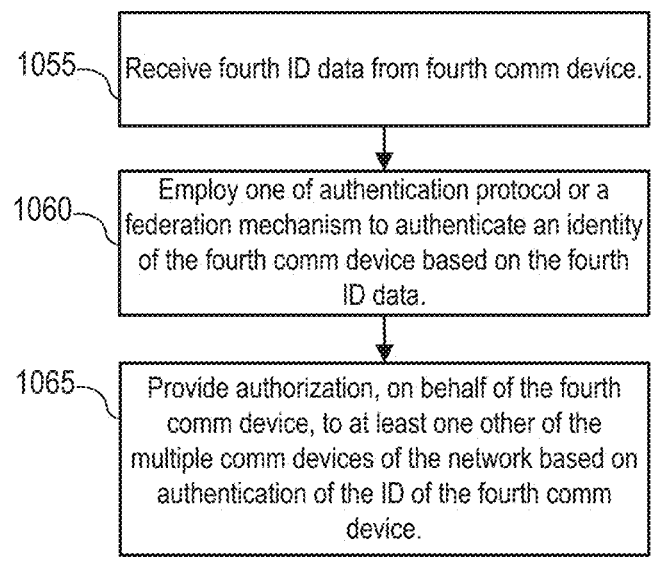
FIG. 10B is a flow chart of a method for authenticating a communication device to act as a proxy node to an external communication device of the network of FIG. 10A according to an embodiment.

FIG. 10B is a flow chart of a method 1050 for authenticating the first communication device 310A or 410A to act as a proxy node to an external communication device (e.g., a fourth communication device) of the network of FIG. 10A according to an embodiment. The method 1000 may be performed by processing logic that may comprise hardware (e.g., circuitry, dedicated logic, programmable logic, microcode, etc.), firmware, or a combination thereof. In one embodiment, method 1000 is performed by processing device 350 of FIG. 3A in the first communication device 310A or 410A.

With further reference to FIG. 10B, the method 1050 may begin with the processing logic of the first communication device receiving fourth identification data from the fourth communication device (1055). The method 1050 may continue with the processing logic of the first communication device employing one of an authentication protocol or a federation mechanism to authenticate an identity of the fourth communication device based on the fourth identification data (1060). The method 1050 may continue with the processing logic of the first communication device providing authentication, on behalf of the fourth communication device, to at least one other of the multiple communication devices of the network based on authentication of the identity of the fourth communication device (1065). To provide such authentication, by the first communication device, may be to repeat the mutual authentication steps set forth in blocks 1005 through 1035 with the second communication device or some other communication device of the multiple communication devices of the network.

The disclosed embodiments may exhibit many advantages over use of conventional TLS or mTLS. For example, with reference to security, the disclosed distributed authentication does not need to rely on a third-party certificate authority (CA). The authority needed to perform particular tasks including configuring nodes and setting permissions may be performed with use of a public key portion of a genesis key as described throughout this disclosure. Authentication data (e.g., identification data, public keys, permissions) may be pinned locally and replicated within different database portions throughout the distributed database, particularly within neighbor nodes. Once this authentication data is pinned or replicated into a neighbor node, changes in such authentication data may be detected and an alert may be generated for unexpected changes (e.g., where a node is not authenticated).

By way of further advantages, the disclosed distributed authentication is easier to manage in not requiring CA certificates. For example, with the use of a public key, the authentication may be performed with a single key pair and authorization may be performed with a check of permissions stored in relation to the public key of the single key pair. Accordingly, rather than having to encode authentication data into digital certificates, the authentication data may be stored in a distributed manner within the distributed database of the network. The authentication is further conveniently updated via use of the genesis public key.

Use of the distributed database is further self-healing, can easily scale to many nodes with use of a DHT as the distributed database, and is resilient to failures in any given node. For self-healing, data is replicated and distributed within portions of the distributed database. Thus, if a nodes were to die (e.g., fail, lose power, become corrupted), the data is not lost. Once the dead nodes are detected, the data is re-replicated to another part of the network, perform self-healing of the network. For example, due to replication of data portions in neighbor nodes, the authentication data of a communication device that fails may easily be restored by way of a backup from a neighbor node. The reduction in dependence on a central database of key data means there is no single source of security vulnerability. Furthermore, there are advantages in reducing bandwidth and resource requirements that would otherwise be necessary with use of a central database such as used with CAs. Although distributed, the disclosed network of multiple communication devices may still be centrally managed, e.g., through use of a bootstrap node or other central source of configuration authority. Furthermore, audits may still be performed by querying the various nodes of the database to check on the status and validity of authentication and authorization data. The audit may therefore be carried out to determine the risk level of one or more communication devices of the network.

Use of the distributed authentication may further easily enable the revocation of authentication and/or authorization data, where revocation of a digital certificate used in PKI is difficult. For example, devices that pin or cache a key should regularly refresh. In various embodiments, the presence of a node in the system is revocable. If that happens, any cached copies are to be removed. That is, neighbor nodes of the node no longer have a connection to the removed node. But that availability is to be checked according to the security standards of the client, e.g., an internal node. The schedule of checking availability may be on a geo-sequential, time-dependent, time-sequential, or random basis, further impeding the ability of malicious actors to scan, read, and reverse engineer the security logic of the described embodiment. Further, a node's permissions are often cached to avoid repeatedly contacting the distributed database. For example, the permissions may be cached every five minutes or so. That way, if a first node is re-connected to the same node within that time period, there is no delay in looking up the permissions. However, there is a balance between performance and security and how often availability to nodes is checked and how often permissions are cached for purposes of quick authentication.

Furthermore, if there is a breach such that a device is no longer authenticated on the network, an alert may cause a system-wide cache purge. For example, the nodes that detect the alert may regenerate a private-public key pair and be reintroduced onto the network, e.g., through a bootstrap node as discussed herein. In various embodiments, a push-based alert is a good middle-ground between performance and security considerations. Data may be cached, potentially for long periods of time (e.g., one hour or maybe even one day), and if a node or a permission of a node is revoked, a push message is sent, rather than waiting for the cache to time out.

Figure 11:
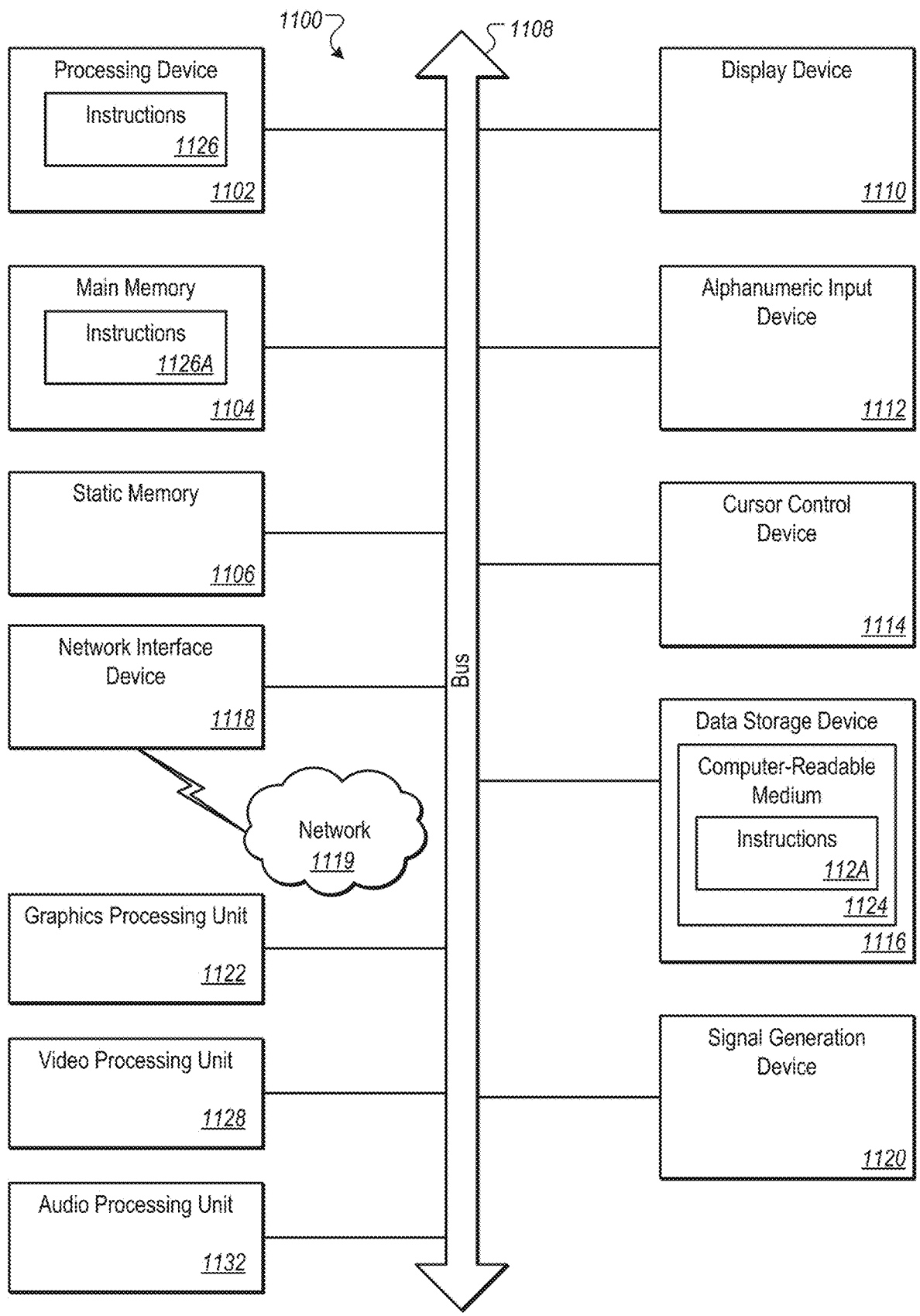
FIG. 11 illustrates a block diagram for a computing system according to various embodiments of any of the communication devices disclosed herein.

FIG. 11 illustrates a diagrammatic representation of a machine in the example form of a computing system 1100 within which a set of instructions, for causing the machine to implement mutual authentication according any one or more of the methodologies discussed herein. In alternative embodiments, the machine may be connected (e.g., networked) to other machines in a LAN, an intranet, an extranet, or the Internet. The machine may operate in the capacity of a server or a client device in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The computing system 1100 includes a processing device 1102, main memory 1104 (e.g., flash memory, dynamic random access memory (DRAM) (such as synchronous DRAM (SDRAM) or DRAM (RDRAM), etc.), a static memory 1106 (e.g., flash memory, static random access memory (SRAM), etc.), and a data storage device 1116, which communicate with each other via a bus 1108.

Processing device 1102 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 1102 may also be one or more special-purpose processing devices such as an application-specific integrated circuit (ASIC), a field programmable gate array (FPGA), a digital signal processor (DSP), network processor, or the like. In one embodiment, processing device 1102 may include one or more processor cores. The processing device 1102 is configured to execute the processing logic 1126 for performing the operations discussed herein.

In one embodiment, processing device 1102 can be part of a processor or an integrated circuit that includes the disclosed security applications. Alternatively, the computing system 1100 can include other components as described herein.

The computing system 1100 may further include a network interface device 1118 communicably coupled to a network 1119. The computing system 1100 also may include a video display device 1110 (e.g., a liquid crystal display (LCD) or a cathode ray tube (CRT)), an alphanumeric input device 1112 (e.g., a keyboard), a cursor control device 1114 (e.g., a mouse), a signal generation device 1120 (e.g., a speaker), or other peripheral devices. Furthermore, computing system 1100 may include a graphics processing unit 1122, a video processing unit 1128 and an audio processing unit 1132. In another embodiment, the computing system 1100 may include a chipset (not illustrated), which refers to a group of integrated circuits, or chips, that are designed to work with the processing device 1102 and controls communications between the processing device 1102 and external devices. For example, the chipset may be a set of chips on a motherboard that links the processing device 1102 to very high-speed devices, such as main memory 1104 and graphic controllers, as well as linking the processing device 1102 to lower-speed peripheral buses of peripherals, such as USB, PCI or ISA buses.

The data storage device 1116 may include a computer-readable storage medium 1124 on which is stored software 1126A embodying any one or more of the methodologies of functions described herein. The software 1126A may also reside, completely or at least partially, within the main memory 1104 as instructions and/or within the processing device 1102 as processing logic 1126 during execution thereof by the computing system 1100; the main memory 1104 and the processing device 1102 also constituting computer-readable storage media.

The computer-readable storage medium 1124 may also be used to store instructions utilizing the processing device 1102, and/or a software library containing methods that call the above applications. While the computer-readable storage medium 1124 is shown in an example embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instruction for execution by the machine and that cause the machine to perform any one or more of the methodologies of the disclosed embodiments. The term "computer-readable storage medium" shall accordingly be taken to include, but not be limited to, solid-state memories, and optical and magnetic media.

While the disclosure has been described with respect to a limited number of embodiments, those skilled in the art will appreciate numerous modifications and variations therefrom. It is intended that the appended claims cover all such modifications and variations as fall within the true spirit and scope of this disclosure.

In the description herein, numerous specific details are set forth, such as examples of specific types of hardware and system configurations, specific hardware structures, specific instruction types, specific system components, and operation in order to provide a thorough understanding of the disclosure. It will be apparent, however, to one skilled in the art that these specific details need not be employed to practice the disclosure. In other instances, well known components or methods, such as specific and alternative hardware or software architectures, specific logic circuits/code for described algorithms, specific firmware code, specific interconnect operation, specific logic configurations, specific manufacturing techniques and materials, specific expression of algorithms in code, specific power down techniques/logic and other specific operational details of a computer system have not been described in detail in order to avoid unnecessarily obscuring the disclosure.

The embodiments are described with reference to mutual authentication of communication devices, such as in computing platforms or microprocessors. The embodiments may also be applicable to other types of integrated circuits and programmable logic devices. For example, the disclosed embodiments are not limited to desktop computer systems or portable computers. And may be also used in other devices, such as handheld devices, tablets, other thin notebooks, systems on a chip (SoC) devices, and embedded applications. Some examples of handheld devices include cellular phones, Internet protocol devices, digital cameras, personal digital assistants (PDAs), and handheld PCs. Embedded applications typically include a microcontroller, a digital signal processor (DSP), a system on a chip, network computers (NetPC), set-top boxes, network hubs, wide area network (WAN) switches, or any other system that can perform the functions and operations taught below. It is described that the system can be any kind of computer or embedded system. Moreover, the apparatuses, methods, and systems described herein are not limited to physical computing devices, but may also relate to software optimizations for energy conservation and efficiency.

Although the above examples describe instruction handling and distribution in the context of execution units and logic circuits, other embodiments of the disclosure can be accomplished by way of a data or instructions stored on a machine-readable, tangible medium, which when performed by a machine cause the machine to perform functions consistent with at least one embodiment of the disclosure. In one embodiment, functions associated with embodiments of the disclosure are embodied in machine-executable instructions. The instructions can be used to cause a general-purpose or special-purpose processor that is programmed with the instructions to perform the steps of the disclosure. Embodiments of the disclosure may be provided as a computer program product or software which may include a machine or computer-readable medium having stored thereon instructions which may be used to program a computer (or other electronic devices) to perform one or more operations according to embodiments of the disclosure. Alternatively, operations of embodiments of the disclosure might be performed by specific hardware components that contain fixed-function logic for performing the operations, or by any combination of programmed computer components and fixed-function hardware components.

Instructions used to program logic to perform embodiments of the disclosure can be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

A design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the disclosure.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as can be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

Use of the phrase 'configured to,' in one embodiment, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'to,' 'capable of/to,' and/or 'operable to,' in one embodiment, refers to some apparatus, logic, hardware, and/or element designed in such a way to enable use of the apparatus, logic, hardware, and/or element in a specified manner. Note as above that use of 'to,' 'capable to,' or 'operable to,' in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example the decimal number ten may also be represented as a binary value of 1010 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that may receive information there from.

Instructions used to program logic to perform embodiments of the disclosure may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

Reference throughout this specification to "one embodiment" or "an embodiment" means that a particular feature, structure, or characteristic described in connection with the embodiment is included in at least one embodiment of the disclosure. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is, here and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like. The blocks described herein can be hardware, software, firmware or a combination thereof.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "defining," "receiving," "determining," "issuing," "linking," "associating," "obtaining," "authenticating," "prohibiting," "executing," "requesting," "communicating," or the like, refer to the actions and processes of a computing system, or similar electronic computing device, that manipulates and transforms data represented as physical (e.g., electronic) quantities within the computing system's registers and memories into other data similarly represented as physical quantities within the computing system memories or registers or other such information storage, transmission or display devices.

The words "example" or "exemplary" are used herein to mean serving as an example, instance or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an embodiment" or "one embodiment" throughout is not intended to mean the same embodiment or embodiment unless described as such. Also, the terms "first, " "second," "third," "fourth," etc. as used herein are meant as labels to distinguish among different elements and may not necessarily have an ordinal meaning according to their numerical designation.

What is claimed is:

1. A communication device comprising:
a memory to store a first portion of a database, wherein the database is distributed across multiple communication devices of a network, which include the communication device; and
a processing device coupled to the memory, the processing device to authenticate a first interaction with a second communication device of the multiple communication devices, wherein to authenticate the first interaction, the processing device is to:
send first identification data to the second communication device with which the second communication device is to authenticate the communication device in view of information stored in the database;
receive second identification data from the second communication device;
retrieve, using the second identification data, a public key associated with the second communication device from one of the first portion of the database or a second portion of the database stored in a third communication device of the multiple communication devices, wherein the third communication device has a third database address that is numerically within a threshold value of a first database address of the communication device; and
verify, based on a permission also stored in relation to the public key, that the second communication device is authorized to engage in the first interaction with the communication device.

2. The communication device of claim 1, wherein the multiple communication devices each is instantiated as one of a software container, a virtual machine, or a bare metal hardware device.

3. The communication device of claim 1, wherein the first identification data comprises one an internet protocol (IP) address, a text label, a medium access control (MAC) address, or a trusted platform module (TPM) generated key of the communication device.

4. The communication device of claim 1, wherein the first database address is a hash of a first public key assigned to the communication device and the third database address is a hash of a third public key assigned to the third communication device.

5. The communication device of claim 1, wherein, to verify authorization to engage in the first interaction, the processing device is further to verify a signature applied to the permission, wherein the signature is associated with a portion of a genesis key used to encode the permission into the database.

6. The communication device of claim 1, wherein, to verify authorization to engage in the first interaction, the processing device is further to verify a signature applied to the permission, wherein the signature is associated with a second permission of the second communication device, wherein the second permission is traceable through one or more additional permissions to a portion of a genesis key used to encode the permission into the database.

7. The communication device of claim 1, wherein the first interaction comprises one of receive data, send data, access a service, or authenticate a fourth communication device, of the multiple communication devices, for electronic interaction with the second communication device.

8. The communication device of claim 1, wherein the processing device, to cause the communication device to act as a proxy to a fourth communication device with which the communication device is communicably coupled, is further to:
receive fourth identification data from the fourth communication device;
employ one of an authentication protocol or a federation mechanism to authenticate an identity of the fourth communication device based on the fourth identification data; and
provide authentication, on behalf of the fourth communication device, to at least one other of the multiple communication devices of the network based on authentication of the identity of the fourth communication device.

9. The communication device of claim 1, wherein the database is a distributed hash table (DHT), and data stored in the DHT is hashed with a database key.

10. The communication device of claim 1, wherein the database is a distributed ledger associated with blockchain technology.

11. A distributed network of multiple communication devices, which comprise:
a first communication device to store, in first memory, a first portion of a database, wherein portions of the database are distributed across the multiple communication devices, and wherein the first portion of the database comprises:
a second public key of a second communication device stored at a second address of the database; and
a third public key of a third communication device stored at a third address of the database, wherein the second address and the third address are numerically within a threshold value of a first address of the database, the first address being assigned to the first communication device; and
wherein a first processing device of the first communication device is to authenticate either of the second communication device or the third communication device via reference to the first portion of the database; and
a second communication device communicatively coupled to the first communication device, the second communication device to store, in second memory, a second portion of the database, wherein the second portion of the database comprises:

a first public key of the first communication device stored at the first address of the database; and a fourth public key of a fourth communication device stored at a fourth address of the database, wherein the first address and the fourth address are numerically within the threshold value of the second address within the database; and wherein a second processing device of the second communication device is to authenticate either of the first communication device or the fourth communication device via reference to the second portion of the database.

12. The distributed network of claim 11, wherein the database is a distributed hash table (DHT), in which data of the DHT is hashed with a database key, and each address of the DHT is determined via a hash of a public key assigned to a corresponding communication device of the multiple communication devices.

13. The distributed network of claim 11, wherein the first processing device is further to store, in the first portion of the database, second identification data of the second communication device in relation to the second public key and third identification data of the third communication device in relation to the third public key, and wherein the second processing device is further to store, in the second portion of the database, first identification data of the first communication device in relation to the first public key and fourth identification data of the fourth communication device in relation to the fourth public key.

14. The distributed network of claim 13, wherein to authenticate a first interaction between the first and second communication devices, the first communication device is to send the first identification data and the first public key to the second communication device, the second communication device is to send the second identification data and the second public key to the first communication device, the first communication device is to determine the second public key is stored in relation to the second identification data in the first portion of the database, and the second communication device is to determine the first public key is stored in relation to the first identification data in the second portion of the database.

15. The distributed network of claim 14, wherein the first interaction comprises access, by the second communication device, to a service provided by the first communication device, and wherein to authorize the first interaction, the first communication device is to verify the first interaction is permitted according to a permission stored in association with second public key within the database.

16. The distributed network of claim 14, wherein the first interaction comprises encoding, by the first communication device, a permission of the second communication device, for which the second communication device is further to:
authenticate a public key portion of a genesis key received from the first communication device; and
add a signature to the permission, the signature derived using the public key portion of the genesis key.

17. The distributed network of claim 11, wherein the first processing device is further to:
store, in relation to the second public key within the first portion of the database, a node type of the second communication device; and
verify that an action associated with an access request, by the second communication device, matches a permission associated with the node type.

18. The distributed network of claim 11, further comprising a fifth communication device comprising a bootstrap node, wherein a third processing device of the fifth communication device, to add the first communication device as a trusted node to the distributed network, is to:
receive the first public key from the first communication device;
hash the first public key to generate the first address;
send the first address to the second communication device and to the third communication device with a genesis public key; and
configure the first communication device comprising to:
store the genesis public key in the first memory;
store the second public key in the first portion of the database in relation to the second address; and
store the third public key in the first portion of the database in relation to the second address.

19. The distributed network of claim 18, wherein the second processing device is further to:
receive the first address within a put command from the fifth communication device;
authenticate, via access to the genesis public key, the fifth communication device as the bootstrap node; and
store, in the second portion of the database, the first address in association with first identification data.

20. In a network comprising multiple communication devices, to authenticate a first interaction between a first communication device and a second communication device of the multiple communication devices, a method comprising:
sending, by the first communication device, first identification data and a first public key to the second communication device with which the second communication device is to authenticate the first communication device in view of information stored in a database distributed throughout the multiple communication devices;
receiving, by the first communication device, second identification data and a second public key from the second communication device;
determining, by the first communication device, that the second identification data and the second public key are stored in relation to each other in one of a first portion of the database, stored in the first communication device, or a third portion of the database, stored in a third communication device of the multiple communication devices, wherein the third communication device has a third database address that is numerically within a threshold value of a first database address of the first communication device; and
verifying, by the first communication device, based on a permission stored in relation to the second identification data, that the second communication device is authorized to engage in the first interaction with the first communication device.

21. The method of claim 20, further comprising, by the second communication device:
receiving the first identification data and the first public key from the first communication device;
determining that the first identification data and the first public key are stored in relation to each other in one of a second portion of the database, stored in the second communication device, or a fourth portion of the database, stored in a fourth communication device of the multiple communication devices, wherein the first communication device has a first database address and the fourth communication device has a fourth database address that are numerically within the threshold value of a second database address of the second communication device; and verifying based on a second permission stored in relation to the first identification data, that the first communication device is authorized to engage in the first interaction with the second communication device.

22. The method of claim 20, wherein, verifying authorization to engage in the first interaction further comprises verifying, by the first communication device, a signature applied to the permission, wherein the signature is associated with a portion of a genesis key used to encode the permission into the database.

23. The method of claim 20, wherein the first interaction comprises one of receiving data, sending data, accessing a service, or authenticating a fourth communication device, of the multiple communication devices, for electronic interaction with the second communication device.

24. The method of claim 20, further comprising, to cause the first communication device to act as a proxy to a fourth communication device with which the first communication device is communicably coupled:

receiving fourth identification data from the fourth communication device;

employing one of an authentication protocol or a federation mechanism to authenticate an identity of the fourth communication device based on the fourth identification data; and providing authentication, on behalf of the fourth communication device, to at least one other of the multiple communication devices of the network based on authentication of the identity of the fourth communication device.

* * * * *